US012621233B2

(12) United States Patent
Boukhtouta et al.

(10) Patent No.: US 12,621,233 B2
(45) Date of Patent: May 5, 2026

(54) QoS AWARE REINFORCEMENT LEARNING PREVENTION INTRUSION SYSTEM

(71) Applicant: Telefonaktiebolaget LM Ericsson (publ), Stockholm (SE)

(72) Inventors: Amine Boukhtouta, Laval (CA); Hyame Alameddine, Montreal (CA); Taous Madi, Thuwal (SA); Christian Miranda Moreira, Montreal (CA); Georges Kaddoum, Laval (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 355 days.

(21) Appl. No.: 18/250,120

(22) PCT Filed: Oct. 22, 2021

(86) PCT No.: PCT/IB2021/059777
§ 371 (c)(1),
(2) Date: Apr. 21, 2023

(87) PCT Pub. No.: WO2022/084952
PCT Pub. Date: Apr. 28, 2022

(65) Prior Publication Data
US 2023/0403600 A1    Dec. 14, 2023

Related U.S. Application Data

(60) Provisional application No. 63/104,607, filed on Oct. 23, 2020.

(51) Int. Cl.
*H04L 45/02*      (2022.01)
*H04L 45/00*      (2022.01)
(Continued)

(52) U.S. Cl.
CPC .............. *H04L 45/02* (2013.01); *H04L 45/00* (2013.01); *H04L 45/08* (2013.01);
(Continued)

(58) Field of Classification Search
CPC ......... G06N 20/00; H04L 45/00; H04L 45/02; H04L 45/08; H04W 28/02; H04W 28/0268; H04W 40/02; H04W 40/18
See application file for complete search history.

(56) References Cited

U.S. PATENT DOCUMENTS

| | | | |
|---|---|---|---|
| 10,230,419 | B2 | 3/2019 | Bharadia et al. |
| 2012/0155475 | A1 | 6/2012 | Vasseur et al. |

(Continued)

FOREIGN PATENT DOCUMENTS

| | | |
|---|---|---|
| CN | 110049527 A | 7/2019 |
| CN | 112822109 A | 5/2021 |

OTHER PUBLICATIONS

Zhu et al., "Network planning with deep reinforcement learning", Aug. 9, 2021, In Proceedings of the 2021 ACM SIGCOMM 2021 Conference (SIGCOMM '21). Association for Computing Machinery, https://doi.org/10.1145/3452296.3472902, pp. 258-271 (Year: 2021).*

(Continued)

*Primary Examiner* — Paul H. Masur
(74) *Attorney, Agent, or Firm* — Weisberg I.P. Law, P.A.

(57) ABSTRACT

Methods, systems, and apparatuses are disclosed. A network node configured for performing network routing associated with a plurality of wireless devices, WDs, in a communication system is described. The network node includes processing circuit configured to collect, from a control plane, a plurality of graph states associated with a plurality of graphs. Each graph of the plurality of graphs has at least one graph node associated with one WD of the plurality of (Continued)

WDs. At least one action is determined, using self-learning, to update at least one route in at least one graph of the plurality of graphs based on the collected plurality of graphs states. The at least one action is transmitted to a controller for instructing at least one WD to update at least one network route based on the at least one action.

32 Claims, 12 Drawing Sheets

(51) Int. Cl.
| | | |
|---|---|---|
| *H04W 28/02* | (2009.01) | |
| *H04W 40/02* | (2009.01) | |
| *H04W 84/18* | (2009.01) | |

(52) U.S. Cl.
CPC ....... *H04W 28/0268* (2013.01); *H04W 40/02* (2013.01); *H04W 84/18* (2013.01)

(56) References Cited

U.S. PATENT DOCUMENTS

| | | | |
|---|---|---|---|
| 2013/0159550 A1 | 6/2013 | Vasseur | |
| 2013/0223218 A1 | 8/2013 | Vasseur et al. | |
| 2014/0029432 A1 | 1/2014 | Vasseur et al. | |
| 2020/0259736 A1* | 8/2020 | She | H04W 40/32 |
| 2021/0099378 A1* | 4/2021 | Alaettinoglu | H04L 45/70 |
| 2021/0119882 A1* | 4/2021 | Orhan | G06N 3/08 |
| 2022/0103462 A1* | 3/2022 | Sidebottom | H04L 45/02 |
| 2022/0376984 A1* | 11/2022 | Wen | H04L 45/08 |

OTHER PUBLICATIONS

International Search Report and Written Opinion dated Jan. 26, 2022 issued in PCT Application No. PCT/IB2021/059777 filed Oct. 22, 2021, consisting of 11 pages.

Mustafa Kocakulak et al., An Overview of Wireless Sensor Networks Towards Internet of Things; Computing and Communication Workshop and Conference, 2017, consisting of 6 pages.

Al-Kashoash, Congestion Control for 6LoWPAN Wireless Sensor Networks: Toward the Internet of Things; Springer, Sep. 2017, consisting of 221 pages.

M.L.F. Miguel, et al., SDN Architecture for 6LoWPAN Wireless Sensor Networks; Sensors, vol. No. 18, No. 11, 2018, consisting of 23 pages.

Hlabishi I. Kobo, et al., A Survey on Software-Defined Wireless Sensor Networks: Challenges and Design Requirements; IEEE Access; vol. 5, 2017, consisting of 28 pages.

Ivan Nedyalkov, Studying of a Modeled IP—Based Network Using Different Dynamic Routing Protocols; IEEE National Conference with International Participation Conference "Electronica 2019", May 16-17, 2019, Sofia, Bulgaria; consisting of 4 pages.

Nicolas Tsiftes et al., Poster Abstract: Low-Power Wireless IPV6 Routing with ContikiRPL; IEEE International Conference Information Processing in Sensor Networks; 2010 Stockholm, Sweden, consisting of 2 pages.

P. Levis et al., The Trickle Algorithm; Internet Engineering Task Force (IETF), RFC6206; 2011, consisting of 13 pages.

Zibuyisile Magubane et al., RPL-Based on Load Balancing Routing Objective Functions for IoTs in Distributed Networks; in IEEE Int. Mult. Inf. Technol. Eng. Conf., 2019, consisting of 6 pages.

Muneer Bani Yassein et al., Performance Evaluation of RPL in High Density Networks for Internet of Things (IoT); In Int. Conf. Soft. and Inf. Eng., 2019, consisting of 5 pages.

Walid Khallef et al., Multiple Constrained QoS Routing with RPL; IEEE ICC 2017 Ad-Hoc and Sensor Networking Symposium, consisting of 7 pages.

P. Thubert et al., Objective Function Zero for the Routing Protocol for Low-Power and Lossy Networks (RPL); Cisco Systems, Mar. 2012, consisting of 16 pages.

Nurrahmat Pradeska et al., Performance Analysis of Objective Function MRHOF and OF0 in Routing Protocol RPL IPV6 Over Low Power Wireless Personal Area Networks (6LoWPAN); 2016 8th International Conference on Information Technology and Electrical Engineering (ICITEE), Yogyakarta, Indonesia, consisting of 6 pages.

Nabil Djedjig et al., New Trust Metric for RPL Routing Protocol; IEEE Int. Conf. Inf. and Commun. Sys., 2017, consisting 8 pages.

Muhammad Ali Lodhi et al., Rank Attack Using Objective Function in RPL for Low Power and Lossy Networks; IEEE Int. Conf. Ind. Inf. and Comp. Syst., 2016, consisting of 6 pages.

P. Thubert, An Architecture for IPV6 over the TSCH mode of IEEE 802.15.4 draft-ietf-6tisch-architecture-15; Jan. 2017, work in Progress. [Online], Internet Draft, Cisco; consisting of 51 pages.

Michael Baddeley et al., Evolving SDN for Low-Power IoT Networks; in IEEE Conference Network Software and Workshops, 2018; consisting of 9 pages.

Michael Baddeley A Low-Overhead SDN Stack and Embedded SDN Controller for Contiki; Jun. 2018, consisting of 8 pages.

Haoyu Song, Protocol-Oblivious Forwarding: Unleash the Power of SDN through a Future-Proof Forwarding Plane; Proceedings of the Second ACM SIGCOMM Workshop on Hot Topics in Software Defined Net-working, ser. HotSDN 13. New York, NY: ACM, 2013, consisting of 6 pages.

Tie Luo et al., Enhancing Responsiveness and Scalability for OpenFlow Networks via Control-Message Quenching; 2012 International Conference on ICT Convergence (ICTC), Oct. 2012, consisting of 6 pages.

Saloua Chettibi et al., An Adaptive Energy-Aware Routing Protocol for MANETs Using The SARSA Reinforcement Learning Algorithm; IEEE Conf. Evolv. and Adapt. Intel. System, 2012, consisting of 6 pages.

Kazunori Iwata, Extending the Peak Bandwidth of Parameters for Softmax Selection in Reinforcement Learning; IEEE Transactions on Neural Networks and Learning Systems, vol. 28, No. 8, Aug. 2017, consisting of 13 pages.

T. Winter et al., IPv6 Routing Protocol for Low-Power and Lossy Networks; Internet Engineering Task Force (IETF); Mar. 2012, consisting of 157 pages.

Communication Under Rule 71(3) EPC dated Jul. 23, 2025, issued in corresponding European Patent Application No. 21 801 640.0, consisting of 8 pages.

Chinese Office Action and English translation of the Chinese Office Action dated Jan. 26, 2026 issued in corresponding Chinese Application No. 202180071930.4, consisting of 18 pages.

Boudouaia et al., "Security Against Rank Attach in RPL Protocol"; IEEE Network, July/Aug. 2020, consisting of 7 pages.

Yu et al., "Computer Applications and Software"; Research Progress on Routing Algorithms for Smart Grid Neighborhood Area Networks; vol. 34, No. 1; Jan. 2017, consisting of 8 pages.

\* cited by examiner

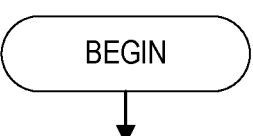

Collect, from a control plane, a plurality of graph states associated with a plurality of graphs, each graph of the plurality of graphs having at least one graph node associated with one WD of the plurality of WDs S106

Determine, using self-learning, at least one action to update at least one route in at least one graph of the plurality of graphs based on the collected plurality of graphs states S108

Transmit the at least one action to a controller for instructing at least one WD to update at least one network route based on the at least one action S110

END

FIG. 9

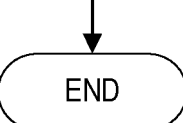

Receive at least one action for instructing the WD to update at least one network route, the at least one action being determined using self-learning, the at least one network route being in at least one graph of a plurality of graphs S112

Update at least one network route based on the received at least one action S114

END

FIG. 10

Warm-up Phase (1)

Production Phase (1)

QoS AWARE REINFORCEMENT LEARNING PREVENTION INTRUSION SYSTEM

CROSS-REFERENCE TO RELATED APPLICATIONS

This application is a Submission Under 35 U.S.C. § 371 for U.S. National Stage Patent Application of International Application No.: PCT/IB2021/059777, filed Oct. 22, 2021 entitled "QoS AWARE REINFORCEMENT LEARNING PREVENTION INTRUSION SYSTEM," which claims priority to U.S. Provisional Application No. 63/104,607, filed Oct. 23, 2020, entitled "QoS AWARE REINFORCEMENT LEARNING PREVENTION INTRUSION SYSTEM," the entireties of both of which are incorporated herein by reference.

TECHNICAL FIELD

The present disclosure relates to wireless communications, and in particular, to rank attacks prevention and/or preventive security controls based at least on quality of service, QoS, awareness based routing in a wireless sensor network.

BACKGROUND

6LowPAN Networks

Wireless sensor networks (WSNs) are considered an important application of the Internet of Things (IoT). In general, WSNs can be considered Low Power and Lossy Networks (LLNs), presenting some constraints on their deployment such as in critical and large-scale scenarios (e.g., massively distributed, and heterogeneous networks). The resource-constrained limitations may prevent the deployment of WSNs in scenarios where the operation is subject to strict reliability and performance requirements. At the same time, the lack of flexibility stems from the rigidity of WSNs towards policy changes, making these networks difficult to adapt. The possibility of direct and bidirectional access to wireless devices using IP technology in WSNs may be considerably reduced the mentioned difficulties, but some other issues emerge concerning the complexity of interconnections.

In WSNs, one goal is to provide end-to-end communication, which allows wireless devices to be accessed without the need for gateways to use network adaptation techniques to enhance efficiency and quality of wireless transmissions. In this context, the 6LoWPAN standard (IPv6 over low power wireless personal area network) has been developed to help avoid such adaptation techniques, thereby making it possible to reach WSN devices with IPv6 addresses. Nevertheless, due to common factors, such as the limited bandwidth, node failures, etc., the wireless links in multi-hop 6LowPAN are unstable, and therefore not reliable. These difficulties can severely impact the performance of the entire network.

The routing decisions in IP-based networks are made by distributed protocols (e.g., Routing Information Protocol (RIP), Open Shortest Path First (OSPF), Border Gateway Protocol (BGP)) that may be used to maintain topology while reducing control overhead in the overall network. Low-power devices have a reduced radio range when compared to typical wireless devices/nodes that communicate with a single base station such that a multi-hop mesh allows systems (WSNs) to be extended over a greater area. Unfortunately, by introducing multiple hops, link uncertainty is compounded across the hop distance and can increase the chance of packets being dropped along the way. Further, the Response Packet Length (RPL) protocol has been adopted to manage routing in 6LowPAN networks where the RPL protocol is described in detail below.

RPL Protocol

RPL is an IPv6 routing protocol designed by the Internet Engineering Task Force (IETF) as a proposed standard. RPL organizes the network topology as DAGs (Directed Acyclic Graphs). A DAG can be partitioned into one or more Destination Oriented DAGs (DODAGs), where each DODAG has a root (Sink) node. Multiple sinks are connected through a backbone network consisting of border routers that connect them to the internet. RPL is a proactive routing protocol that starts to find routes based on a predefined Objective Function (OF) established as soon as the RPL network is initialized. The OF is used to deliver traffic to different routes according to traffic requirements. These requirements are encoded within the OF and used by the RPL during routing operations. RPL makes use of three different types of control messages, namely DIO (DODAG Information Object), DIS (DODAG Information Solicitation), and DAO (DODAG Advertisement Object), as illustrated in FIG. 1.

The sink node (e.g., node A) transmits DIO messages at regular intervals determined by a trickle algorithm. The DIO message provides information to the sensor nodes that enable them to discover RPL instances, learn the configuration parameters, and select the preferred parent set. For the selection of the parent set, RPL uses the OF, which comprises of one or more routing metrics. The DIS message is used by a new sensor node or a floating DODAG to solicit DIO information from another node in its vicinity to join a DODAG. DAO messages are propagated by the sensor nodes to the sink node to update the topological view of the DODAG. Thus, the formation of the DODAG topology is maintained by the sink node. The RPL operations include neighborhood discovery, route generation, DAG construction, data path validation, and loop detection based on rank values.

A rank value is a scalar representation of the location of a node within a DODAG. The 6LowPAN has unique characteristics that may require new routing metrics and constraints, which can be used by the RPL in the path computation. These metrics/constraints can be categorized into two basic types: (1) Node metrics and related constraints (e.g., hop counts, energy state), and (2) Link metrics and related constraints (e.g., throughput, latency, packet loss).

SD6LowPAN Reference Model

Software Defined Networking (SDN) has turned into a de-facto arrangement for introducing scalability and programmability to network architectures including data centers and optical networks. It has shown advances in network configurability, virtual network functions plugin as well as reduction in capital expenditure. The advantages of SDN have led to its adoption in IEEE low-power wireless standard, which hinges on IoT and sensor networks. With a focus on the SDN reconfigurability, sensors and traffic control are performed on a per-flow basis, which helps in optimizing the network for low-energy communication. In one example, the SDN approach has been adopted in the centralized scheduling within IETF 6TiSCH architecture to provide spatial diversity within IEEE 802.15.4-2015 industrial IoT networks.

Further, a design and implementation termed μSDN was proposed. The latter is a low-overhead SDN architecture which is meant to implement additional optimization techniques that are compatible with IPv6 networks and interoperable with RPL protocol. This SDN can improve QoS for high-priority flows and integrate protocol optimization in part by one or more of eliminating fragmentation, reducing packet frequency, matching over bytes rather than parsing whole headers, throttling control messages, refreshing Flowtable timers, eliminating repeated entries in flowtables, reducing buffer sizes, etc. A flowtable may generally define a forwarding or communication policy for flows such as how to handle/route one or more flows based on one or more predefined rules.

The SD6LowPAN reference model that is illustrated in FIG. 2 encloses data plane, control plane and application plane. The data plane consists of IoT nodes (sensors), which supports sensing functionality, routing of uplink flows and forwarding of downlink flows. The application plane consists of a set of applications that receive/handle information received or sent to the data plane. The control plane provides the role of the bridge between application plane and data plane. The inner workings of SD6LowPAN may rely on μSDN, which implements RPL protocol and maintains interactions through southbound and northbound application program interfaces (APIs). Below provides a description of μSDN components such as the Adapter, the Engine and the Driver. In addition, core μSDN processes are introduced.

μSDN Stack Implementation

The μSDN Stack provides a layered architecture and API to separate core function handling from the specifics of the SDN implementations.

μSDN Protocol: μSDN uses its own lightweight protocol (e.g., low complexity protocol) for controller communication. μSDN Protocol is transported over UDP to allow secure DTLS (Datagram Transport Layer Security) when communicating with controllers outside the mesh and is highly optimized to help ensure no packet fragmentation.

Controller Adapter: Exposes an abstract controller interface to the SDN layer, allowing the μSDN Protocol to be switched out for any other protocol which implements that interface.

SDN Engine: Defines how the messages to and from the controller are handled. This is the concrete implementation of the protocol logic, dictating how the node handles controller communication.

SDN Driver: Provides an API for the SDN Engine by defining how the Flowtable actions are handled. It provides high-level functions for performing certain tasks through the setting of Flowtable entries such as: creating firewall entries, setting routing paths through the network, or ag-aggregating flows. It also determines how and when nodes should defer to the controller for instruction.

Core μSDN Processes

The μSDN Core provides essential SDN processes, allowing protocol and framework specific implementations to be built on top of it.

Controller Discovery: Integrates with the network's distributed routing protocol. This gives the node fallback or default routing if a node loses its connection to the controller. Although this is currently RPL (both Storing and Non-Storing), this functionality could in theory be any distributed routing protocol implemented within the network. This grants controller connections within μSDN an element of robustness and helps ensure nodes will always attempt to find a path to the controller.

Controller Join: This Open Systems Interconnection (OSI) Layer-3 (also referred to as just "Layer 3" or "L3") process employs both the underlying RPL topology, as well as the μSDN protocol provided by the SDN stack. When the controller receives an RPL DAO (destination advertisement) message, the controller will send a μSDN CONF message to the joining node in order to initialize the node and provide configuration information. The joining node uses this CONF message as acknowledgement that it is connected to the controller.

Configuration and Metrics Management: Allows controllers to setup the SDN network, choose which metrics to receive from the node, and select what information to receive in controller requests.

Flowtable Support: Optimized for memory due to node hardware constraints. Using a similar approach to Protocol Oblivious Forwarding (PoF) allows for a Flowtable with a minimal memory footprint. Additionally, a Hierarchical Flowtable Structure (HFS) interface is provided to allow controllers to configure multiple flowtables with varying priority levels. This, for example, allows the controller to configure a whitelist, which is processed before the main Flowtable. Packets matched in this whitelist are then handed back to the regular Layer-3 processes.

Overhead Reduction: Several functions are implemented to mitigate SDN control overhead. Control-Message Quenching (CMQ) is used to handle repeated Flowtable misses. Partial Packet Queries (PPQ) allow Flowtable requests to be sent to the controller using, for example, only partial packet information, reducing 6LoWPAN fragmentation. Source Routing Header Insertion (SRHI) allows routing headers to be inserted onto packets and can be read by either the RPL or SDN layer. Finally, Flowtable Refresh (FR) allows controllers to instruct particularly active Flowtable entries to reset their life-timers, rather than having the entry expire.

FIG. 3 is a diagram that illustrates example μSDN stack and core processes and depicts the RPL stack components along with core processes.

Further, one factor in the selection of parent nodes in RPL protocol, along with the rank, is the OF. If a node acquires a valid rank, it must calculate the value of the OF based on the routing metrics before changing the preferred parent node. For example, if the routing metric relies on the Expected Transmission Count (ETX) where the OF is defined to keep the routing path with the lowest ETX value, then a node will receive both the rank and ETX for the preferred parent node. In this scenario, to successfully launch a Rank attack (i.e., type of security attack), the attacking node must corrupt the routing metric announced by the parent node so that the OFs of the neighboring nodes favor the attacking node. In this regard, Rank attacks have raised serious concerns about the weakness of the objective function of the RPL.

In particular, the RPL protocol commonly implements two objective functions, the Minimum Rank with Hysteresis Objective Function (MRHOF) and the Objective Function Zero (OF0). The latter constructs a DAG with the lowest number of hops, while the former constructs a DAG with the lowest ETX to select the best path. Since the existing OFs consider only one or two metrics, the DODAGs may not be able to fully satisfy some recent applications which require several QoS constraints such as packet loss, duty cycle, and end-to-end delay. For instance, OF0 chooses the shortest path; however, it does not necessarily ensure the end-to-end delay requirement, which may be an essential constraint for interactive applications. Furthermore, in the MRHOF, the objective function aims to minimize the expected total number of packet transmissions required to deliver a packet to the ultimate destination successfully. Note, DODAG uses only one OF for topology formation and maintenance.

To illustrate a Rank attack, a network topology with the ETX as the primary routing metric is considered where an attacking node has a legitimate rank Rl, and the maximum rank between the neighbors is Rn. In this illustration, the attacker may advertise a rank value less than Rn to start the attack; thus, the attacker may modify its rank to one below Rn, where the announced rank for the attacker Ra can be expressed as Ra<Rn. If the announced rank of Ra is too low, then the attacker's neighbors (e.g., neighbor nodes) will drop this rank value because the RPL recommends that the rank change must be within a threshold. Otherwise, the unexpected rank can induce an unstable network topology. Consequently, in Rank attacks, the attacker advertises a rank with the ratio Rp<Ra<Rn, where Rp is the attacker's preferred parent node rank. The rank change announced by the attacker is not drastic but is smaller than most of the neighboring nodes, which may be able to destabilize the network topology. To raise the severity of the attack, the ETX advertised in the DIG message is drastically diminished compared to the minimum observed between neighbors.

As illustrated in FIG. 4, the neighboring nodes of the attacker (compromised) node 6 selects the latter as their new preferred parent node because it changes its rank from R=3 to R=2 and the ETX announced in the DIG message is lower than the minimum perceived between neighbor nodes. As a result of such a ranking misuse, new nonoptimal links are considered (illustrated by dashed lines in FIG. 4), which implicitly impacts the network performance. Therefore, the use of RPL protocol in wireless sensor networks is not without issues.

SUMMARY

Some embodiments advantageously provide methods, systems, and apparatuses for rank attacks prevention and/or preventive security controls based at least on quality of service, QoS, awareness based routing in a wireless sensor network.

One or more embodiments described herein rely on the SDN paradigm to introduce an intelligent application support for the control plane for the purpose of preventing security attacks (e.g., rank attacks) against RPL protocol in SD6LowPAN or 6LowPAN networks. For example, one or more embodiments, a RL agent has been configured for the application plane in order to interact with a modified lightweight SDN controller, namely, μSDN. The RL agent's objective may be to achieve routing optimization and QoS provisioning relying on metrics like transmission and queue delays as well as packet rate loss (i.e., objective defined by one or more metric thresholds). The optimization allows for the system to bypass the RPL routing rank mechanism, which makes SD6LowPAN and/or 6LowPAN preventive with respect to rank attacks. The RL agent is a programmable asset that hooks into the control plane to decide on building routes such as routes between one or more nodes. In one or more embodiments, the RL agent as well as its interaction with the control plane constitutes a stack that can be supported by a border router for 6LoWPAN networks.

According to one or more aspects of the disclosure, one or more of the following are provided:

An online self-learning routing application in SD6LowPAN reference architecture is provided.

A mechanism to capture DODAG states including flow tables and metrics from SD6LowPAN to build a ground truth for the self-learning routing application.

A QoS aware design to optimize routing through an online policy recursive learning.

The design encloses one or more of:

DODAGs' states, potential actions on nodes, delay and packet loss rate as a ground truth collected from the control plane.

Three functions, namely, cost of actions, reward considering a state and a set of actions on DODAG nodes, and a policy state/action selection probabilistic model.

Interactive Quality value learning mechanism to evaluate routing optimization through RL model convergence.

A replacement to weak objective functions that define routing in RPL protocol, which are not resilient to rank attacks coming from data plane.

The QoS awareness self-learning application that allows the capture of optimized paths without considering routing rank mechanism, which intrinsically help provide a prevention mechanism against rank attacks.

RL application plane and control plane as an intelligent stack on a SD6LowPAN and/or 6LowPAN border router that is preventive against rank attacks observed on RPL protocol, and that is QoS aware with respect to delays and packet loss rate.

According to an aspect of the present disclosure, a network node configured for performing network routing associated with a plurality of wireless devices (WDs) in a communication system is described. The network node includes processing circuit configured to collect, from a control plane, a plurality of graph states associated with a plurality of graphs, where each graph of the plurality of graphs has at least one graph node associated with one WD of the plurality of WDs; determine, using self-learning, at least one action to update at least one route in at least one graph of the plurality of graphs based on the collected plurality of graphs states; and causing the network node to transmit the at least one action to a controller for instructing at least one WD to update at least one network route based on the at least one action.

In an embodiment, the self-learning is based at least in part on a quality of service parameter.

In some embodiments, the plurality of graph states includes flowtables and metrics, the metrics include at least one of a transmission delay, a packet loss rate, and a queue delay.

In some other embodiments, the self-learning includes any one of entering a warm-up phase including exploring the plurality of graphs states as a ground truth to self-learn optimizing network routes; and entering a production phase including exploiting the explored plurality of graph states of the warm-up phase and determining a plurality of actions including the at least one action to update the at least on route in at least one graph.

In an embodiment, the self-learning further includes any one of monitoring a topology of at least one graph of the plurality of graphs; when at least one WD has been one of removed from and added to the at least one graph, one of enter and continue with the warm-up phase; and when at least one WD has not been one of removed from and added to the at least one graph, one of enter and continue with the production phase.

In another embodiment, the self-learning further includes any one of selecting a random state depicting a graph snapshot and a random plurality of actions for each graph node and evaluating the selected random state and the random plurality of actions using a probabilistic policy based on a derived quality value.

In some embodiments, the self-learning further includes determining a reward based on a cost of the random plurality of actions, the selected random state, an overall transmission delay, a queue delay, and overall packet loss rate; determining a future state and a future action; evaluating an action selection policy based on the derived quality value; learning another quality value by evaluating an impact of the reward and how the future state and the future action compare with the selected random state and random plurality of actions; updating a current state with the future state and a current action with the future action; and capturing an overall quality value determine a convergence.

In some other embodiments, updating the current state and the current action includes selecting a graph node that is a parent to another graph node, where the selecting is based at least on the derived quality value.

In an embodiment, the controller is in the control plane, the at least one WD is in a data plane, and transmitting the at least one action triggers the WD to update the at least one network route.

In another embodiment, the plurality of graphs is a plurality of Destination Oriented Directed Acyclic Graphs, DODAGs.

In some embodiments, the communication system includes a wireless sensor network, the network routing is a Quality of Service, QoS, awareness-based routing that is performed in Routing Protocol for low Power and Lossy networks, RPL, in the wireless sensor network. The network node is a border router to the wireless sensor network. The wireless sensor network is a IPv6 low power wireless personal area network, SD6LowPAN, network.

According to another aspect, a method implemented in a network node configured for performing network routing associated with a plurality of wireless devices, WDs, in a communication system is describe. The method includes collecting, from a control plane, a plurality of graph states associated with a plurality of graphs, each graph of the plurality of graphs having at least one graph node associated with one WD of the plurality of WDs; determining, using self-learning, at least one action to update at least one route in at least one graph of the plurality of graphs based on the collected plurality of graphs states; and transmitting the at least one action to a controller for instructing at least one WD to update at least one network route based on the at least one action.

In an embodiment, the self-learning is based at least in part on a quality of service parameter.

In some embodiments, the plurality of graph states includes flowtables and metrics, the metrics include at least one of a transmission delay, a packet loss rate, and a queue delay.

In some other embodiments, the self-learning includes any one of entering a warm-up phase including exploring the plurality of graphs states as a ground truth to self-learn optimizing network routes; and entering a production phase including exploiting the explored plurality of graph states of the warm-up phase and determining a plurality of actions including the at least one action to update the at least on route in at least one graph.

In an embodiment, the self-learning further includes any one of monitoring a topology of at least one graph of the plurality of graphs; when at least one WD has been one of removed from and added to the at least one graph, one of enter and continue with the warm-up phase; and when at least one WD has not been one of removed from and added to the at least one graph, one of enter and continue with the production phase.

In another embodiment, the self-learning further includes any one of selecting a random state depicting a graph snapshot and a random plurality of actions for each graph node and evaluating the selected random state and the random plurality of actions using a probabilistic policy based on a derived quality value.

In some embodiments, the self-learning further includes determining a reward based on a cost of the random plurality of actions, the selected random state, an overall transmission delay, a queue delay, and overall packet loss rate; determining a future state and a future action; evaluating an action selection policy based on the derived quality value; learning another quality value by evaluating an impact of the reward and how the future state and the future action compare with the selected random state and random plurality of actions; updating a current state with the future state and a current action with the future action; and capturing an overall quality value determine a convergence.

In some other embodiments, updating the current state and the current action includes selecting a graph node that is a parent to another graph node, where the selecting is based at least on the derived quality value.

In an embodiment, the controller is in the control plane, the at least one WD is in a data plane, and transmitting the at least one action triggers the WD to update the at least one network route.

In another embodiment, the plurality of graphs is a plurality of Destination Oriented Directed Acyclic Graphs, DODAGs.

In some embodiments, the communication system includes a wireless sensor network, the network routing is a Quality of Service, QoS, awareness-based routing that is performed in Routing Protocol for low Power and Lossy networks, RPL, in the wireless sensor network. The network node is a border router to the wireless sensor network. The wireless sensor network is a IPv6 low power wireless personal area network, SD6LowPAN, network.

According to another aspect of the present disclosure, a wireless device, WD, configured to communicate with a network node in a communication system, where the WD includes processing circuitry and a radio interface in communication with the processing circuitry. The radio interface is configured to receive at least one action for instructing the WD to update at least one network route, where the at least one action is determined using self-learning, and the at least one network route is in at least one graph of a plurality of graphs. The processing circuitry is configured to update the at least one network route based on the received at least one action.

In an embodiment, the self-learning is based at least in part on a quality of service parameter.

In some embodiments, the received at least one action is further determined based on flowtables and metrics associated with the at least one graph, where the metrics include at least one of a transmission delay, a packet loss rate, and a queue delay. In some other embodiments, the instructing is in a data plane. In an embodiment, the plurality of graphs is a plurality of Destination Oriented Directed Acyclic Graphs, DODAGs.

In another embodiment, the communication system includes a wireless sensor network, the at least one network route is a Quality of Service, QoS, awareness-based routing that is performed in Routing Protocol for low Power and Lossy networks, RPL, in the wireless sensor network. The network node is a border router to the wireless sensor network. The wireless sensor network is a IPv6 low power wireless personal area network, SD6LowPAN, network.

According to another aspect, a method implemented in a wireless device, WD, configured to communicate with a network node in a communication system is described. The method includes receiving a at least one action for instructing the WD to update at least one network route, where the at least one action is determined using self-learning, and the at least one network route is in at least one graph of a plurality of graphs. The method further includes updating the at least one network route based on the received at least one action.

In an embodiment, the self-learning is based at least in part on a quality of service parameter.

In some embodiments, the received at least one action is further determined based on flowtables and metrics associated with the at least one graph, where the metrics include at least one of a transmission delay, a packet loss rate, and a queue delay. In some other embodiments, the instructing is in a data plane. In an embodiment, the plurality of graphs is a plurality of Destination Oriented Directed Acyclic Graphs, DODAGs.

In another embodiment, the communication system includes a wireless sensor network, the at least one network route is a Quality of Service, QoS, awareness-based routing that is performed in Routing Protocol for low Power and Lossy networks, RPL, in the wireless sensor network. The network node is a border router to the wireless sensor network. The wireless sensor network is a IPv6 low power wireless personal area network, SD6LowPAN, network.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a flowchart of another example process in a network node according to some embodiments of the present disclosure;

FIG. 10 is a flowchart of another example process in a wireless device according to some embodiments of the present disclosure;

DETAILED DESCRIPTION

Figure 1:
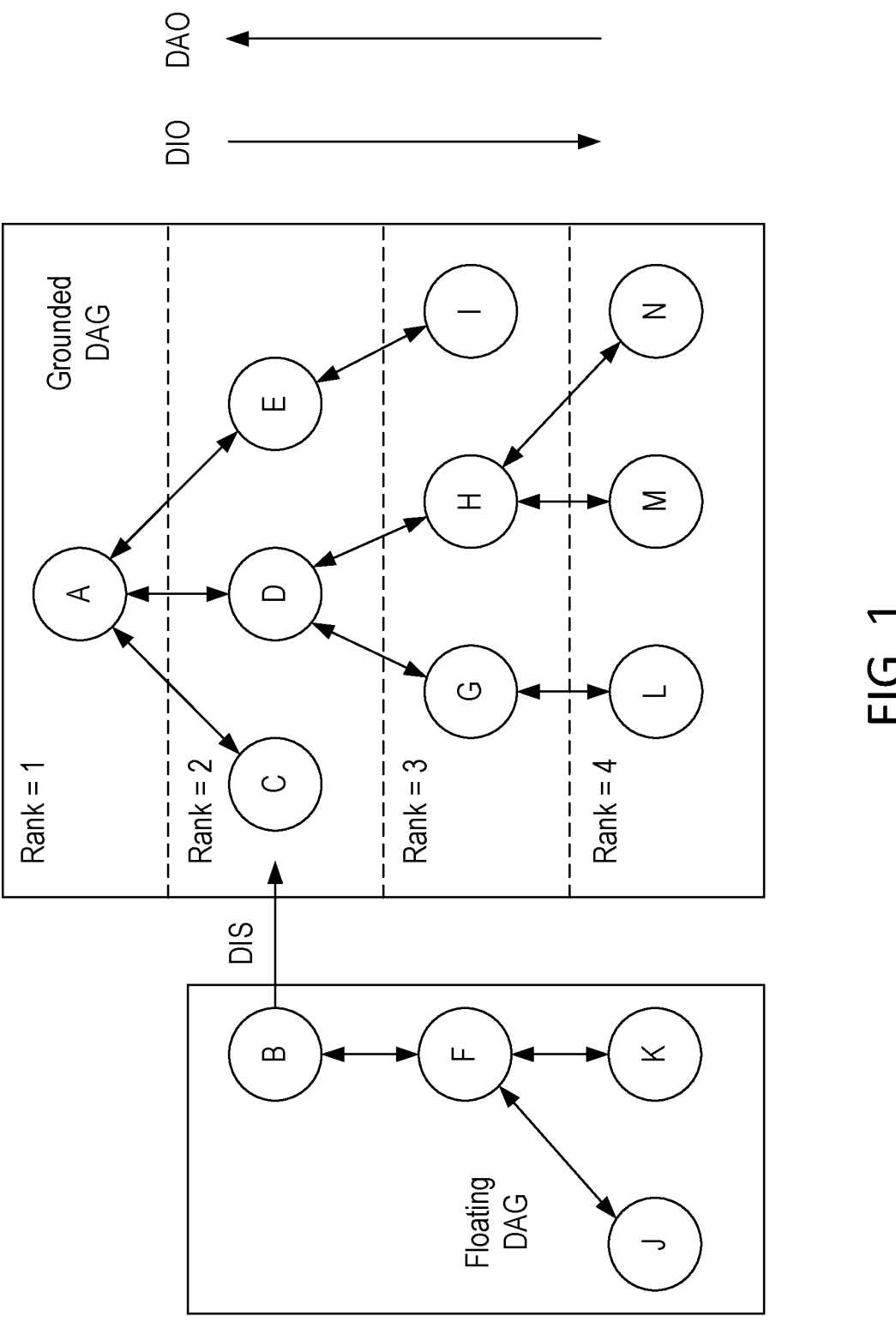
FIG. 1 is a diagram of a destination oriented directed acyclic graph (DODAG)
Figure 2:
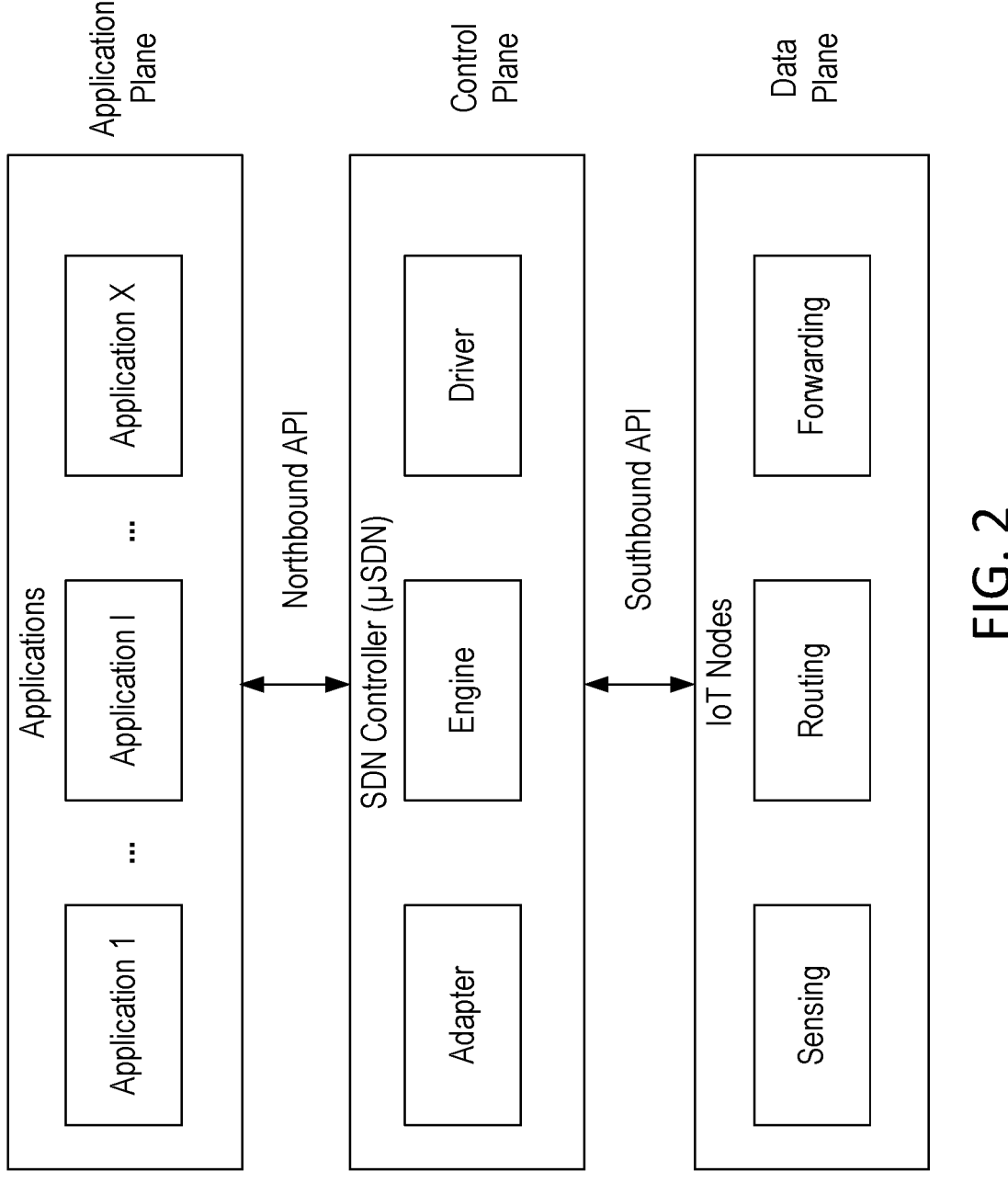
FIG. 2 is a diagram of a SD6LowPAN reference model.
Figure 3:
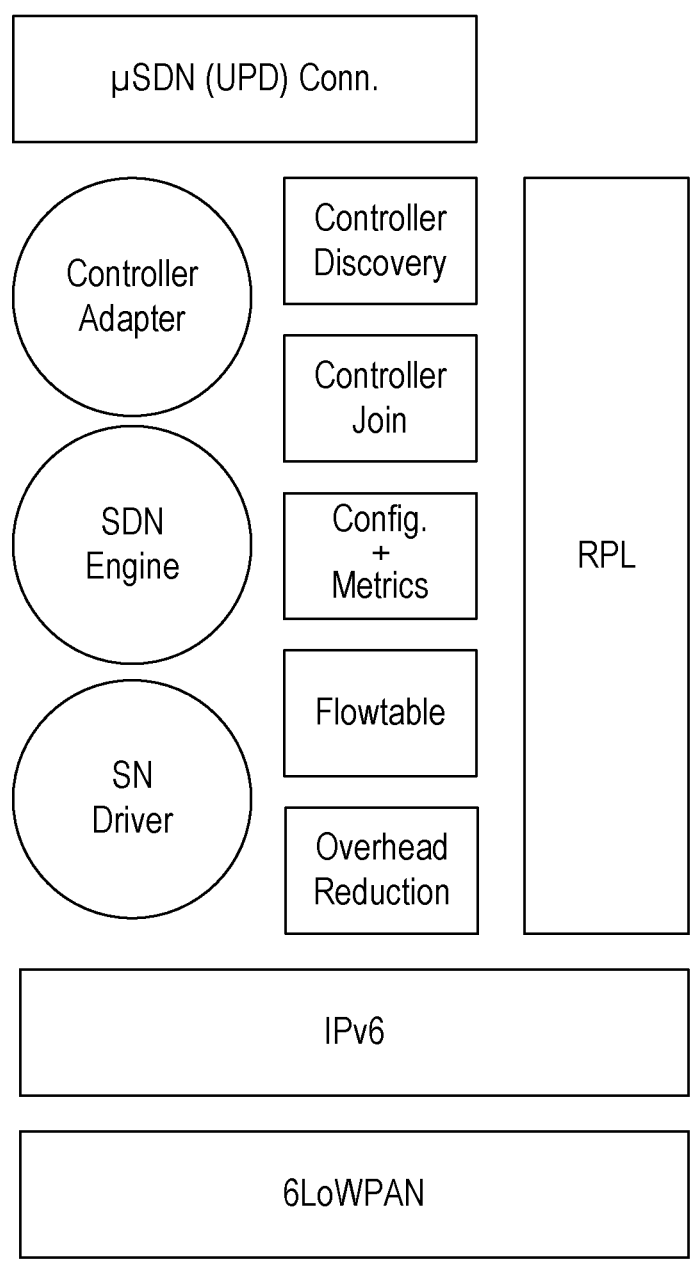
FIG. 3 is a diagram of a μSDN Architecture.
Figure 4:
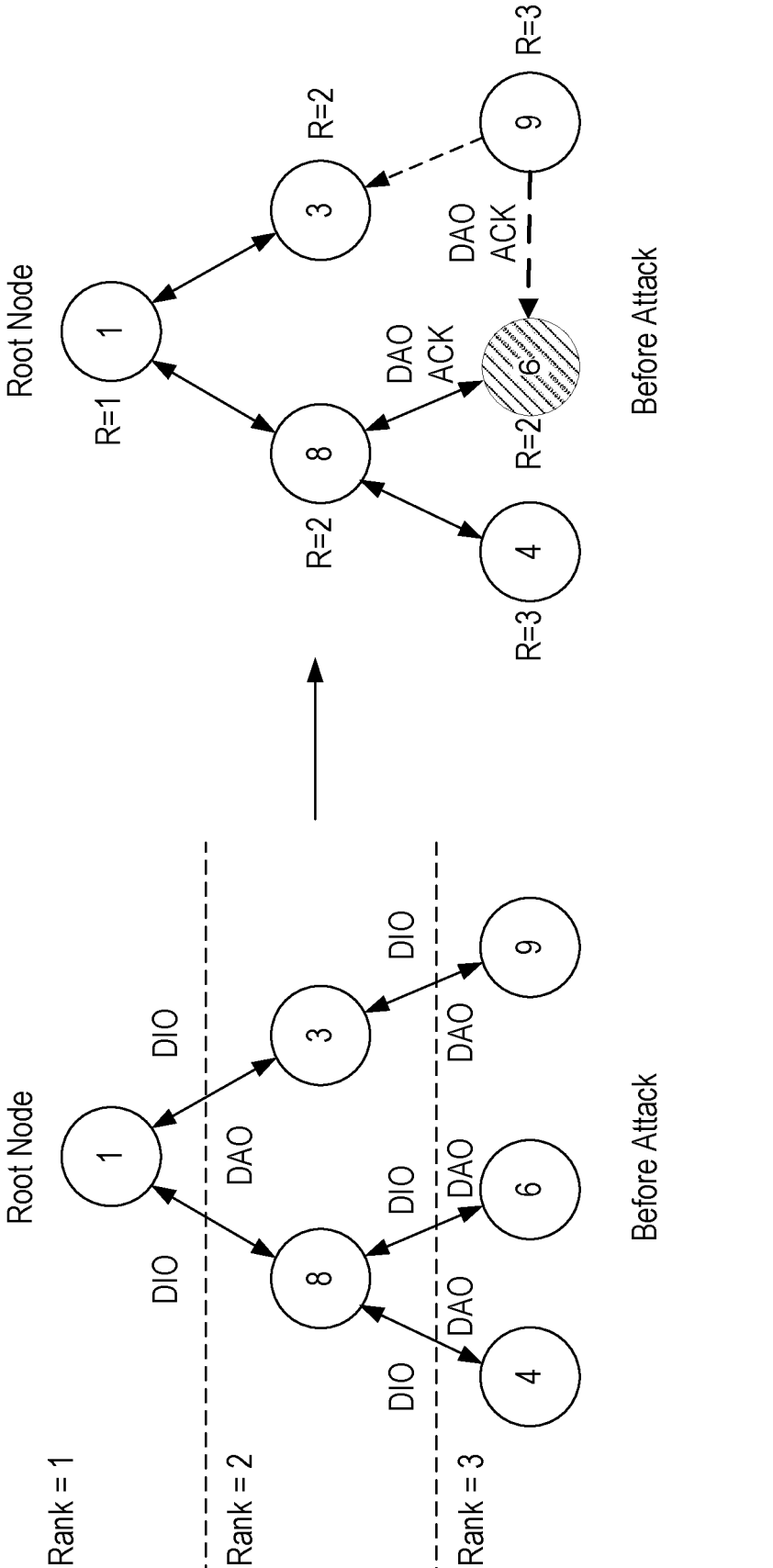
FIG. 4 is a diagram of a rank attack.

In the context of RPL protocol in wireless sensor networks (WSNs), RL seems to be a more promising and realistic solution, which relies on an agent that explores and interact with SD6LowPAN and/or 6LowPAN networks' environment to capture RPL DODAGs as a ground truth to learn on RPL inner-workings to obtain a routing optima, which helps prevents Rank attacks.

One or more embodiments described herein help solve at least one of the problems with existing wireless sensor networks such as SD6LowPAN networks at least in part by providing a self-learning intelligence capability to support a preventive security control to cope with security attacks (e.g., rank attacks) in SD6LowPAN networks. In other words, one or more embodiments of the disclosure help solve one of the following problem statements How to introduce a QoS awareness reinforcement-learning agent to prevent rank attacks in SD6LowPAN reference architecture?

How to model the interaction between QoS awareness reinforcement-learning agent and SD6LowPAN deployment environment?

How QoS awareness reinforcement-learning agent prevents rank attacks in RPL protocol?

Therefore, one or more embodiments advantageously provide a reinforcement learning mechanism to prevent rank attacks in SD6LowPAN networks based on quality of service awareness. Further, the details of the solution described herein may be described in terms of reference architecture and mechanisms to tackle aforementioned questions.

Before describing in detail exemplary embodiments, it is noted that the embodiments reside primarily in combinations of apparatus components and processing steps related to rank attacks prevention and/or preventive security controls based at least on quality of service, QoS, awareness based routing in a wireless sensor network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node. The network node may further include a border router/gateway, e.g., in communication with a wireless sensor network and/or any component of the wireless sensor network.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc. In one or more embodiments, a wireless device may be a node in a wireless sensor network (WSN) as described herein.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide rank attacks prevention and/or preventive security controls based at least on quality of service, QoS, awareness based routing in a wireless sensor network.

Figure 5:
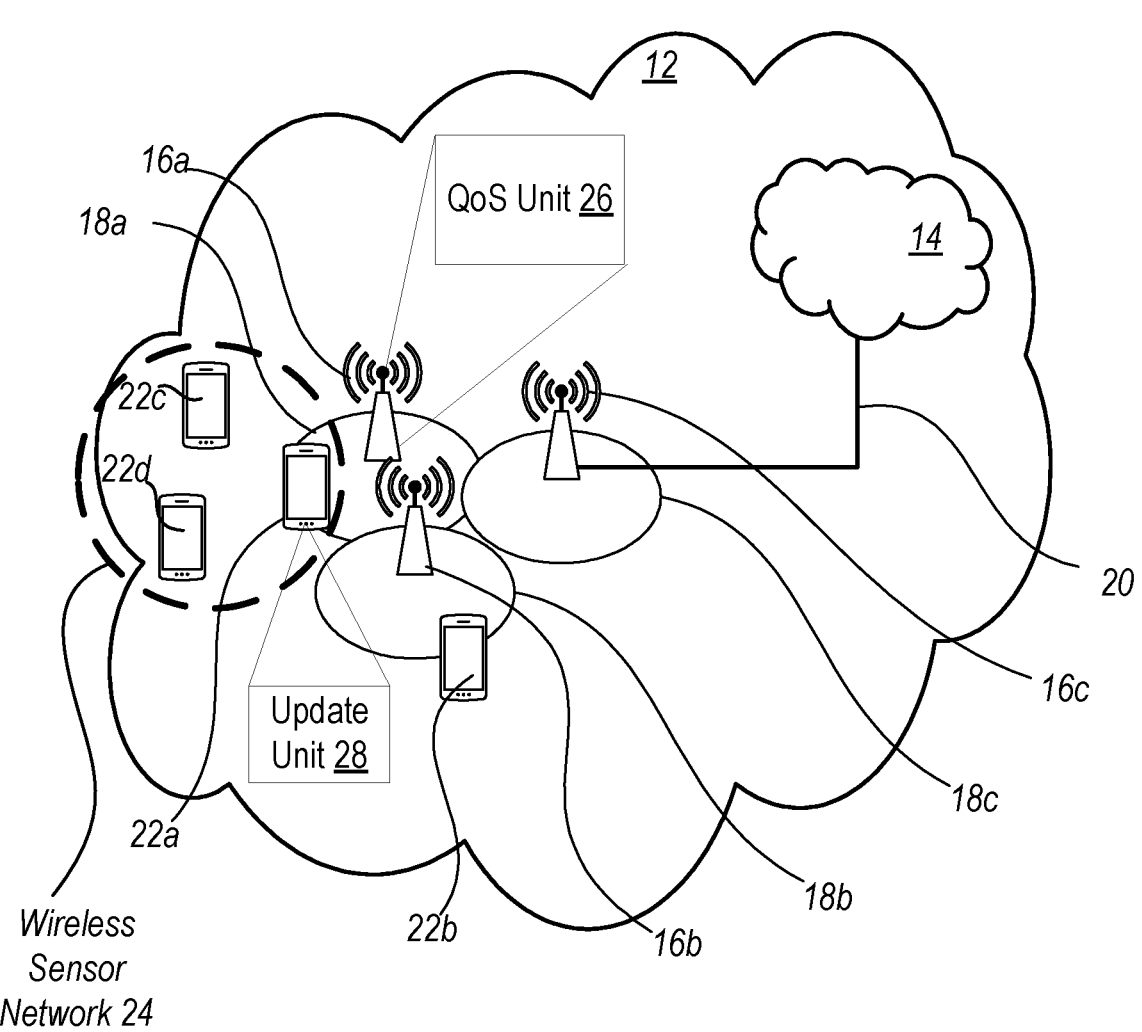
FIG. 5 is a schematic diagram of an example network architecture illustrating a communication system according to the principles in the present disclosure.

Referring now to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. For example, the communication system may include WD 22c and WD 22d may be located outside or at the edge of coverage area 18a such that WD 22c and WD 22d may or may not be served by network node 16a but may still be able to form a wireless sensor network 24 (WSN 24) with WD 22a.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a QoS unit 26 which is configured to perform one or more network node 16 functions as described herein such as with respect to rank attacks prevention and/or preventive security controls based at least on quality of service, QoS, awareness based routing in a wireless sensor network 24. In one or more embodiments, QoS unit 26 may provide and/or correspond to an agent such as a RL agent that is described below. A wireless device 22 is configured to include an update unit 28 which is configured to perform one or more wireless device 22 functions as described herein such as with respect to rank attacks prevention and/or preventive security controls based at least on quality of service, QoS, awareness based routing in a wireless sensor network 24.

Example implementations, in accordance with an embodiment, of the WD 22 and network node 16 discussed in the preceding paragraphs will now be described with reference to FIG. 6. In a communication system 10, a network node 16 is provided where the network node 16 includes hardware 30 enabling it to communicate with the WD 22. The hardware 30 may include a communication interface 32 for setting up and maintaining a wired or wireless connection with an interface of a different communication device of the communication system 10, as well as a radio interface 34 for setting up and maintaining at least a wireless connection with a WD 22 located in a coverage area 18 served by the network node 16. The radio interface 34 may be formed as or may include, for example, one or more RF transmitters, one or more RF receivers, and/or one or more RF transceivers.

In the embodiment shown, the hardware 30 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include QoS unit 26 configured to perform one or more network node 16 functions as described herein such as with respect to rank attacks prevention and/or preventive security controls based at least on quality of service, QoS, awareness based routing in a wireless sensor network 24.

The communication system 10 further includes the WD 22 already referred to. The WD 22 may have hardware 44 that may include a radio interface 46 configured to set up and maintain a wireless connection with one or more of a network node 16 serving a coverage area 18 in which the WD 22 is currently located and another wireless device 22 such as a wireless device 22 in a wireless sensor network 24. The radio interface 46 may be formed as or may include, for example, one or more RF transmitters, one or more RF receivers, and/or one or more RF transceivers.

The hardware 44 of the WD 22 further includes processing circuitry 48. The processing circuitry 48 may include a processor 50 and memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 54, which is stored in, for example, memory 52 at the WD 22, or stored in external memory (e.g., database, storage array, network storage device, etc.) accessible by the WD 22. The software 54 may be executable by the processing circuitry 48. The software 54 may include a client application 56. The client application 56 may be operable to provide a service to a human or non-human user via the WD 22. The client application 56 may interact with the user to generate the user data that it provides.

The processing circuitry 48 may be configured to control any of the methods and/or processes described herein and/or to cause such methods, and/or processes to be performed, e.g., by WD 22. The processor 50 corresponds to one or more processors 50 for performing WD 22 functions described herein. The WD 22 includes memory 52 that is configured to store data, programmatic software code and/or other information described herein. In some embodiments, the software 54 and/or the client application 56 may include instructions that, when executed by the processor 50 and/or processing circuitry 48, causes the processor 50 and/or processing circuitry 48 to perform the processes described herein with respect to WD 22. For example, the processing circuitry 48 of the wireless device 22 may include update unit 28 configured to perform one or more wireless device 22 functions as described herein such as with respect to rank attacks prevention and/or preventive security controls based at least on quality of service, QoS, awareness based routing in a wireless sensor network.

Figure 6:
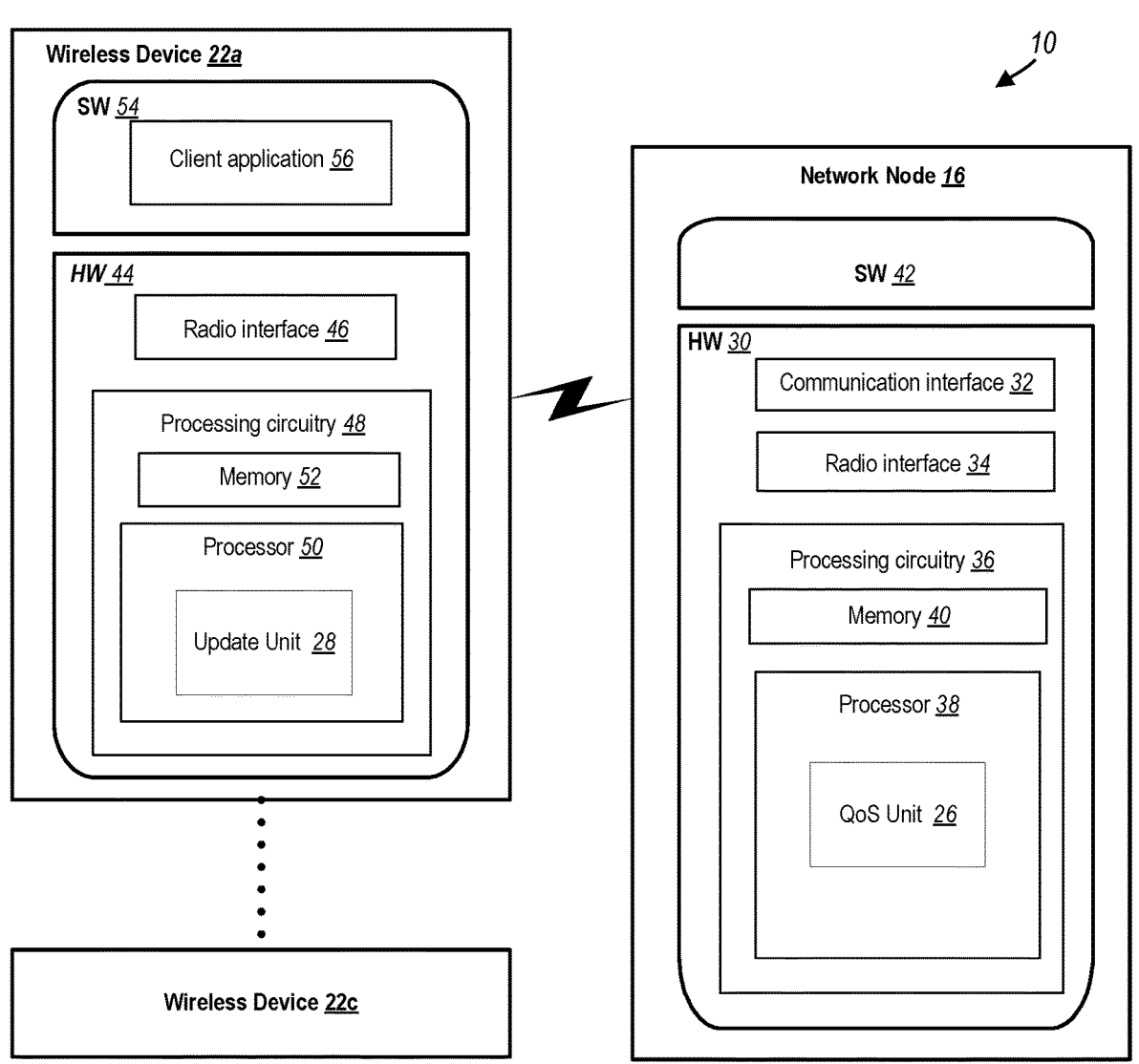
FIG. 6 is a block diagram of a portion of the communication system according to some embodiments of the present disclosure.

In some embodiments, the inner workings of the network node 16 and WD 22 may be as shown in FIG. 6 and independently, the surrounding network topology may be that of FIG. 5.

Although FIGS. 5 and 6 show various "units" such as QoS unit 26 and update unit 28 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 7:
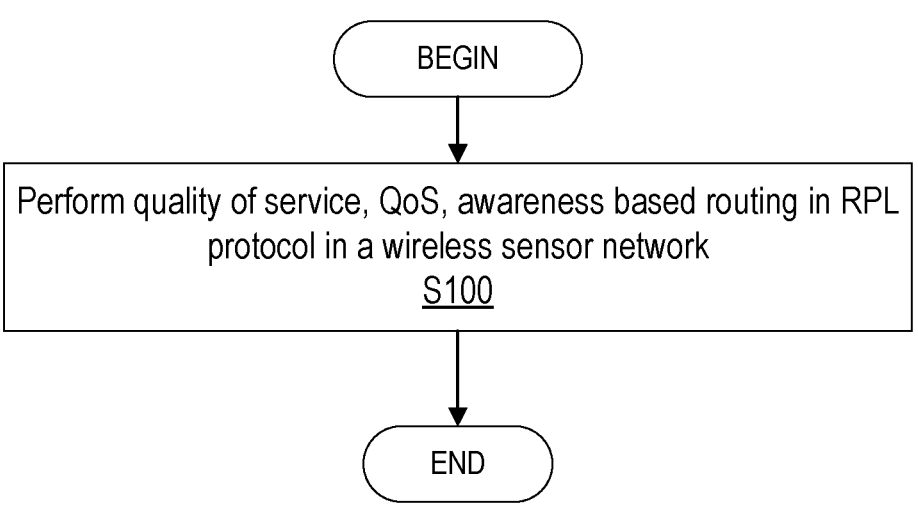
FIG. 7 is a flowchart of an example process in a network node according to some embodiments of the present disclosure.

FIG. 7 is a flowchart of an example process in a network node 16 according to some embodiments of the present disclosure. One or more Blocks and/or functions performed by network node 16 may be performed by one or more elements of network node 16 such as by QoS unit 26 in processing circuitry 36, processor 38, radio interface 34, etc. In one or more embodiments, network node 16 such as via one or more of processing circuitry 36, processor 38, QoS unit 26, communication interface 32 and radio interface 34 is configured to perform (Block S100) quality of service, QoS, awareness based routing in Routing Protocol for Low-Power and Lossy Networks, RPL, protocol in a wireless sensor network 24, as described herein.

According to one or more embodiments, the network node 16 is a border router to the wireless sensor network 24, and the wireless sensor network 24 is a IPv6 low power wireless personal area network, SD6LowPAN, network. According to one or more embodiments, the performing of QoS awareness based routing in RPL protocol includes: receiving, from a control plane, flowtables and metrics associated with a plurality of Destination Oriented Directed Acyclic Graphs (DODAGs); determining at least one action to update at least one route in at least one DODAG based on the received flowtables and metrics; and pushing the at least one action to a controller in the control plane for instructing nodes in a data plane to update the at least one route based on the at least one action. According to one or more embodiments, the metrics include at least one of transmission delay, packet loss rate and queue delay.

Figure 8:
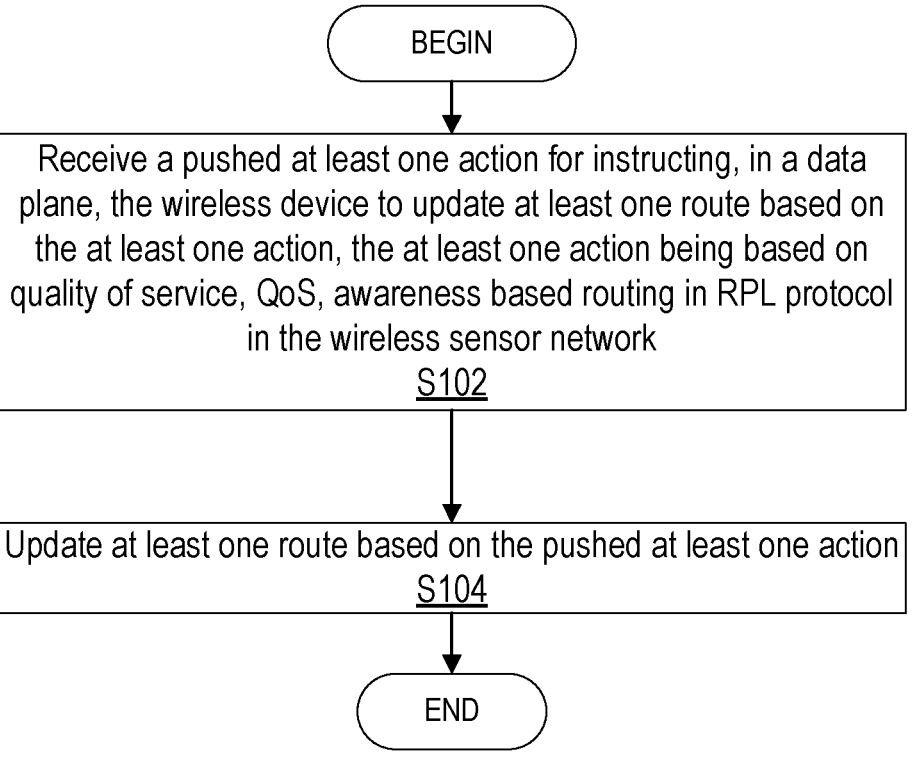
FIG. 8 is a flowchart of an example process in a wireless device according to some embodiments of the present disclosure.

FIG. 8 is a flowchart of an example process in a wireless device 22 according to some embodiments of the present disclosure. One or more Blocks and/or functions performed by wireless device 22 may be performed by one or more elements of wireless device 22 such as by update unit 28 in processing circuitry 48, processor 50, radio interface 46, etc. In one or more embodiments, wireless device such as via one or more of processing circuitry 48, processor 50, update unit 28 and radio interface 46 is configured to receive (Block S102) a pushed at least one action for instructing, in a data plane, the wireless device 22 to update at least one route based on the at least one action where the at least one action is based on quality of service, QoS, awareness based routing in RPL protocol in the wireless sensor network 24. In one or more embodiments, wireless device such as via one or more of processing circuitry 48, processor 50, update unit 28 and radio interface 46 is configured to update (Block S104) at least one route based on the pushed at least one action, as described herein.

According to one or more embodiments, the network node 16 is a border router to the wireless sensor network 24, and the wireless sensor network 24 is a IPv6 low power wireless personal area network, SD6LowPAN, network. According to one or more embodiments, the pushed at least one action is based on flowtables and metrics associated with at least one Destination Oriented Directed Acyclic Graphs (DODAGs), and the metrics include at least one of transmission delay, packet loss rate and queue delay.

FIG. 9 is a flowchart of an example process in a network node 16 according to some embodiments of the present disclosure. One or more Blocks and/or functions performed by network node 16 may be performed by one or more elements of network node 16 such as by QoS unit 26 in processing circuitry 36, processor 38, radio interface 34, etc. In one or more embodiments, network node 16 such as via one or more of processing circuitry 36, processor 38, QoS unit 26, communication interface 32 and radio interface 34 is configured to collect (Block S106), from a control plane, a plurality of graph states associated with a plurality of graphs, where each graph of the plurality of graphs has at least one graph node associated with one WD of the plurality of WDs (22); determine (Block S108), using self-learning, at least one action to update at least one route in at least one graph of the plurality of graphs based on the collected plurality of graphs states; and transmit (Block S110) the at least one action to a controller for instructing at least one WD (22) to update at least one network route based on the at least one action.

In an embodiment, the self-learning is based at least in part on a quality of service parameter.

In some embodiments, the plurality of graph states includes flowtables and metrics, the metrics include at least one of a transmission delay, a packet loss rate, and a queue delay.

In some other embodiments, the self-learning includes any one of entering a warm-up phase including exploring the plurality of graphs states as a ground truth to self-learn optimizing network routes; and entering a production phase including exploiting the explored plurality of graph states of the warm-up phase and determining a plurality of actions including the at least one action to update the at least on route in at least one graph.

In an embodiment, the self-learning further includes any one of monitoring a topology of at least one graph of the plurality of graphs; when at least one WD (22) has been one of removed from and added to the at least one graph, one of enter and continue with the warm-up phase; and when at least one WD (22) has not been one of removed from and added to the at least one graph, one of enter and continue with the production phase.

In another embodiment, the self-learning further includes any one of selecting a random state depicting a graph snapshot and a random plurality of actions for each graph node and evaluating the selected random state and the random plurality of actions using a probabilistic policy based on a derived quality value.

In some embodiments, the self-learning further includes determining a reward based on a cost of the random plurality of actions, the selected random state, an overall transmission delay, a queue delay, and overall packet loss rate; determining a future state and a future action; evaluating an action selection policy based on the derived quality value; learning another quality value by evaluating an impact of the reward and how the future state and the future action compare with the selected random state and random plurality of actions; updating a current state with the future state and a current action with the future action; and capturing an overall quality value determine a convergence.

In some other embodiments, updating the current state and the current action includes selecting a graph node that is a parent to another graph node, where the selecting is based at least on the derived quality value.

In an embodiment, the controller is in the control plane, the at least one WD (22) is in a data plane, and transmitting the at least one action triggers the WD (22) to update the at least one network route.

In another embodiment, the plurality of graphs is a plurality of Destination Oriented Directed Acyclic Graphs, DODAGs.

In some embodiments, the communication system (10) includes a wireless sensor network, the network routing is a Quality of Service, QoS, awareness-based routing that is performed in Routing Protocol for low Power and Lossy networks, RPL, in the wireless sensor network. The network node (16) is a border router to the wireless sensor network. The wireless sensor network is a IPv6 low power wireless personal area network, SD6LowPAN, network.

FIG. 10 is a flowchart of an example process in a wireless device 22 according to some embodiments of the present disclosure. One or more Blocks and/or functions performed by wireless device 22 may be performed by one or more elements of wireless device 22 such as by update unit 28 in processing circuitry 48, processor 50, radio interface 46, etc. In one or more embodiments, wireless device 22 such as via one or more of processing circuitry 48, processor 50, update unit 28 and radio interface 46 is configured to receive (Block S112) a at least one action for instructing the WD (22) to update at least one network route, where the at least one action is determined using self-learning, and the at least one network route is in at least one graph of a plurality of graphs; and update (Block S114) the at least one network route based on the received at least one action.

In an embodiment, the self-learning is based at least in part on a quality of service parameter.

In some embodiments, the received at least one action is further determined based on flowtables and metrics associated with the at least one graph, where the metrics include at least one of a transmission delay, a packet loss rate, and a queue delay. In some other embodiments, the instructing is in a data plane. In an embodiment, the plurality of graphs is a plurality of Destination Oriented Directed Acyclic Graphs, DODAGs.

In another embodiment, the communication system (10) includes a wireless sensor network, the at least one network route is a Quality of Service, QoS, awareness-based routing that is performed in Routing Protocol for low Power and Lossy networks, RPL, in the wireless sensor network. The network node (16) is a border router to the wireless sensor network. The wireless sensor network is a IPv6 low power wireless personal area network, SD6LowPAN, network.

Having described the general process flow of arrangements of the disclosure and having provided examples of hardware and software arrangements for implementing the processes and functions of the disclosure, the sections below provide details and examples of arrangements for rank attacks prevention and/or preventive security controls based at least on quality of service, QoS, awareness based routing in a wireless sensor network 24.

SD6LowPAN Reinforcement Learning Lifecycle

Figure 11:
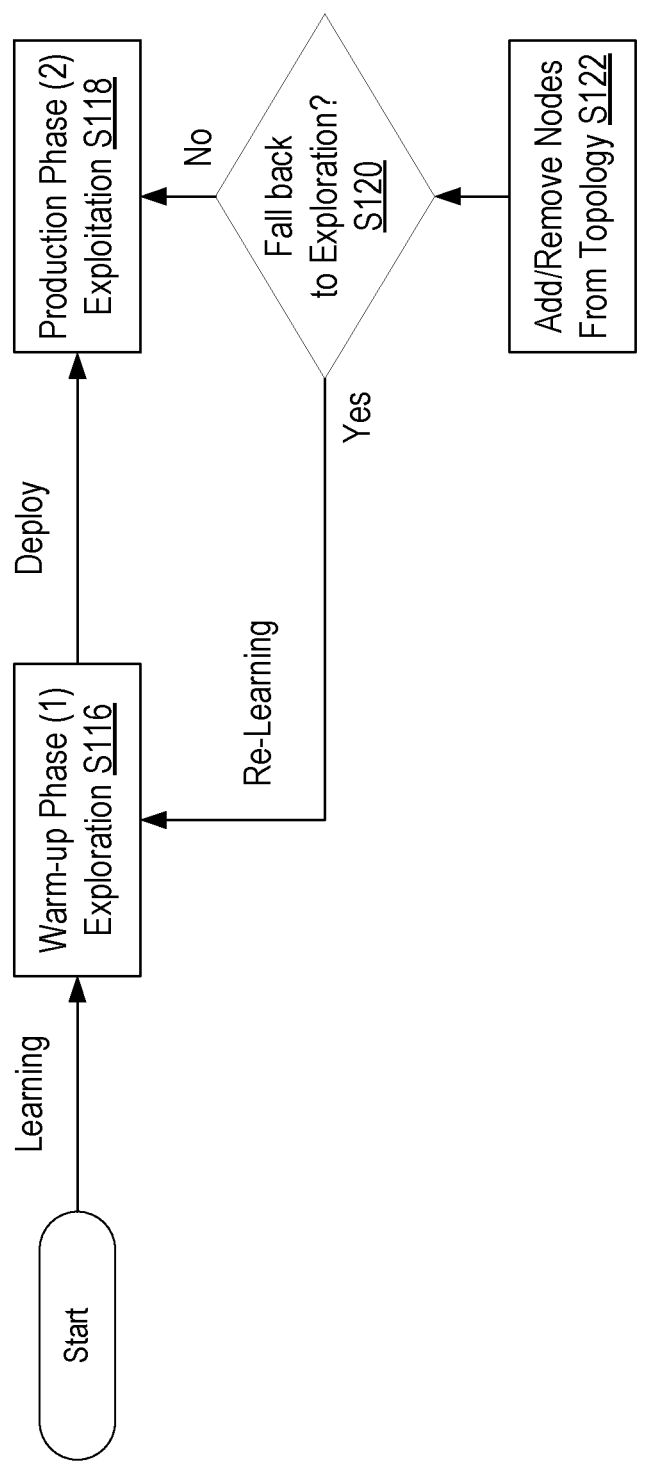
FIG. 11 is a diagram of an example SD6LowPAN reinforcement learning lifecycle according to some embodiments of the present disclosure.

FIG. 11 is a flowchart of an example SD6LowPAN reinforcement learning lifecycle according to one or more embodiment of the present disclosure. The SD6LowPAN Reinforcement Learning (RL) Lifecycle consists of the different phases that an agent (e.g., RL agent) may need to self-learn on how to optimize routing based on DODAGs' states, metrics. After learning is kicked-off (e.g., initiated, started, etc.), at step S116, the RL agent enters such as via one or more of processing circuitry 36, processor 38, radio interface 34, etc., a warm-up phase to explore one or more of states, metrics and potential actions that are performed to optimize routing in SD6LowPAN networks. The second phase includes deploying such as via one or more of processing circuitry 36, processor 38, radio interface 34, etc., the RL agent and, at step S118, entering such as via one or more of processing circuitry 36, processor 38, radio interface 34, etc., the phase of exploitation, where the RL agent hooks such as via one or more of processing circuitry 36, processor 38, radio interface 34, etc., to the control plane of SD6LowPAN, where actions are pushed to decide about the routing of uplink packets. Upon adding to or removing nodes from DODAGs at step S122, the RL agent has the possibility to fall back into exploration phase at step S120 to reinforce again its routing optimization.

Warm-Up Phase

Figure 12:
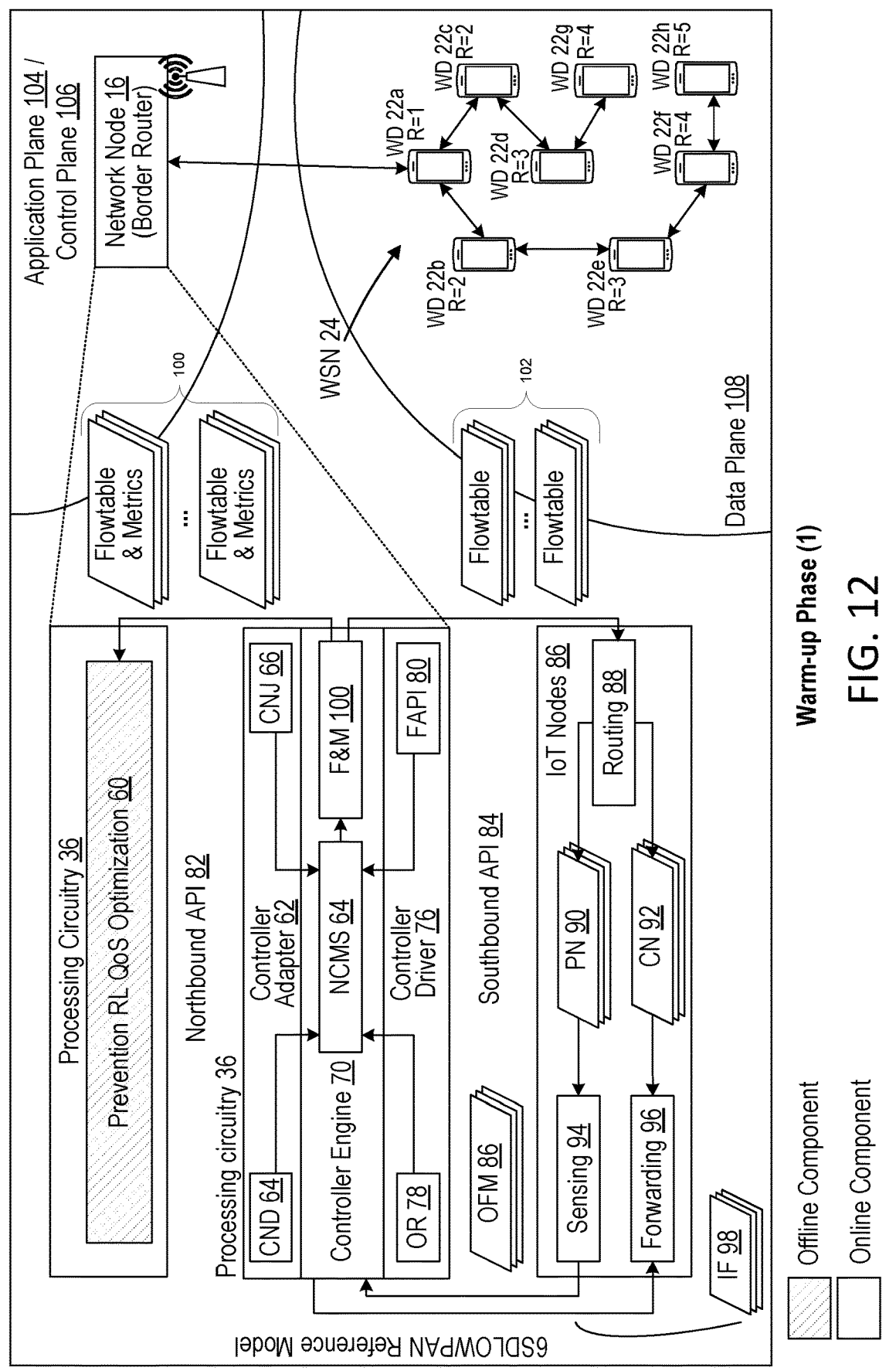
FIG. 12 is a diagram of an example warm-up phase according to some embodiments of the present disclosure.

FIG. 12 is a diagram of an example warm-up phase according to one or more embodiments of the disclosure. The example warm-up phase includes a network node 16 (e.g., a border router), which may include one or more components, e.g., as part of processing circuitry 36 and/or any other network node element/component shown in FIG. 6. The one or more components that may be included in network node 16 (e.g., the border router) are prevention RL QoS optimization 60, a controller adapter 62, controller engine 70 (e.g., also referred to as engine), and controller driver 76. RL QoS optimization may be an offline component during the warm-up phase but is not limited as such. The combination of any one of controller adapter 62, controller engine 70, and controller driver 76 may be referred to as controller. Controller adapter 62 may include Controller Nodes Discovery (CND) 64 and/or Controller Nodes Join (CNJ) 66. Controller engine 70 may include Network Configuration and Metrics Support (NCMS) 72 and/or flowtable and metrics 100. Any one of the controller adapter 62, controller engine 70, and/or controller driver 76 may communicate with prevention RL QoS Optimization 60 via a northbound API 82 (e.g., to transmit/receive/exchange/collect flowtable and metrics 100) and/or with IoT nodes 86 (e.g., WDs 22) and any component of the IoT nodes 86 via a southbound API 84 (e.g., to transmit/receive/exchange/collect flowtable 102 and/or incoming flows (IF) 98). Further, network node 16 (e.g., border router) may be part of and/or operate in any one of an application plane 104 and/or control plane 106.

In addition, IoT nodes 86 may include routing 88, parent nodes 90, child nodes 92, sensing 94, and/or forwarding 96. IoT nodes 86 may refer to any one of WDs 22. Any component of IoT nodes may be part of any component/element of WD 22 (as shown in FIG. 6), such as processing circuitry 48. WDs 22 (e.g., WDs 22a, 22b, 22c, 22d, 22e, 22f, 22g, 22h) may be part of a wireless sensor network 24 and be part of and/or operate in a data plane 108. Each WD 22 may have a rank (e.g., R=1, 2, 3, 4, 5). Any WD 22 may communicate directly/indirectly with the network node 16 (e.g., WD 22a such as a root node in a DODAG) may communicate directly network node 16 (e.g., border router). Although arrows are shown to indicate communication between some of the components described in FIG. 12, any component may communicate with any other component shown.

In the warm-up phase, flowtables and metrics 100 are captured/collected from the control engine 70 (e.g., µSDN engine) prior to controller node discovery and join that is supported by the adapter. Flowtables and metrics 100 are pushed (i.e., transmitted, sent, etc.) such as via one or more of processing circuitry 36, processor 38, radio interface 34, etc., towards Prevention RL QoS Optimization Agent 60 through the northbound API 82 channel. The flowtables and metrics 100 are considered as ground truth to let the agent self-learn how to optimize routes. A trial/error approach may be applied through actions on DODAGs by either considering the same parent nodes (lower rank) or changing them with respect to child nodes (higher rank). The actions may cause the routes on flowtables (e.g., flowtables 102) to be updated by considering a certain cost as well as a QoS metrics to reward them positively or negatively. The RL agent (e.g., RL Agent 114 shown in FIG. 14) and/or prevention RL QoS Optimization 60 may be in offline mode and may try to capture as much as flowtables and metrics 100 to refine its self-learning.

Production Phase

Figure 13:
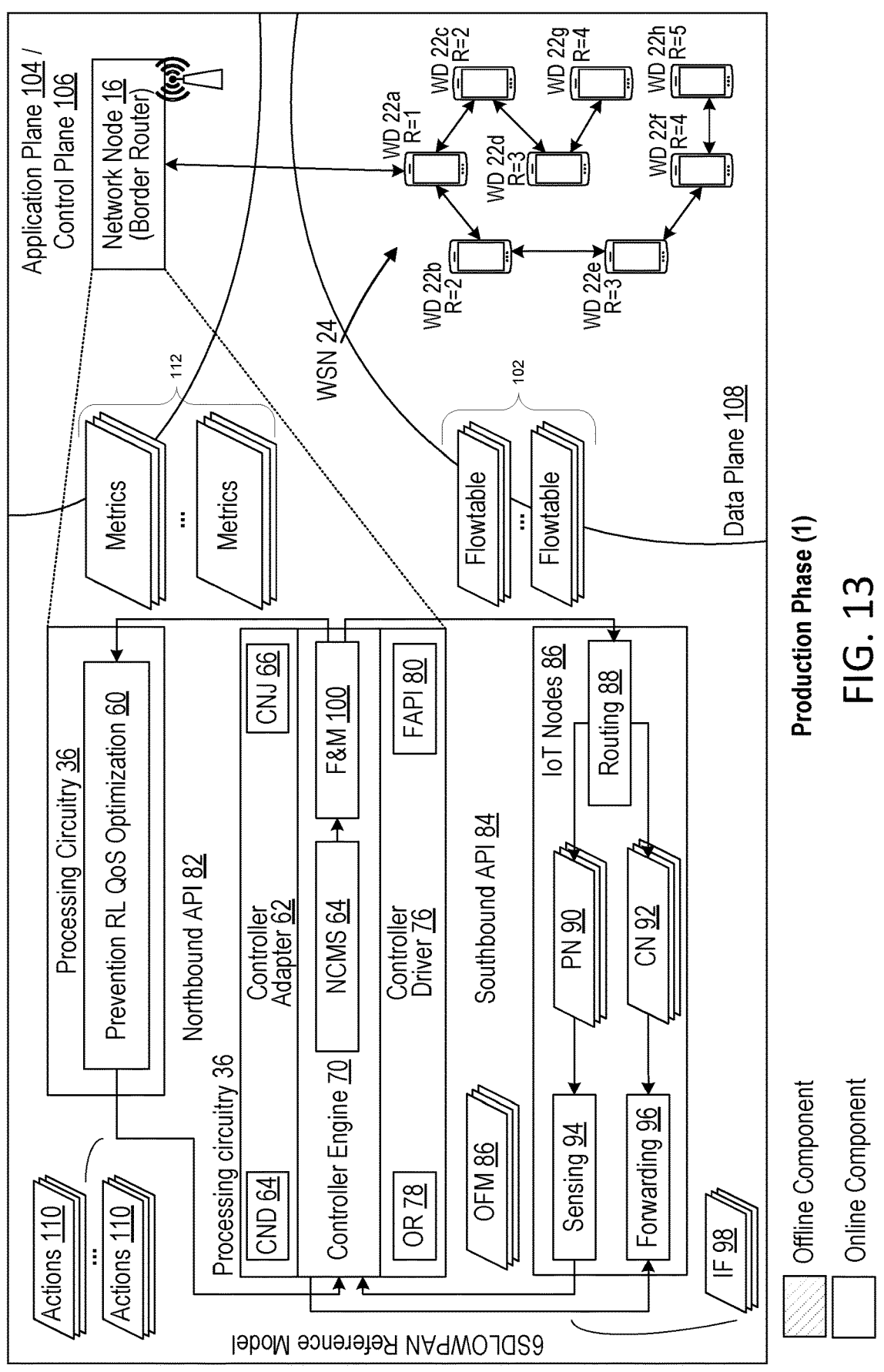
FIG. 13 is diagram of an example production phase according to some embodiments of the present disclosure.

FIG. 13 is a diagram of a production phase according to one or more embodiments of the present disclosure. FIG. 13 includes components/blocks/relationships already described with respect to FIG. 12. Any one of the controller adapter 62, controller engine 70, and/or controller driver 76 may communicate with prevention RL QoS Optimization 60 via a northbound API 82 (e.g., to transmit/receive/exchange/collect actions 110 and metrics 112) and/or with IoT nodes 86 (e.g., WDs 22) and any component of the IoT nodes 86 via a southbound API 84 (e.g., to transmit/receive/exchange/collect flowtable 102 and/or incoming flows (IF) 98). Although arrows are shown to indicate communication between some of the components described in FIG. 12, any component may communicate with any other component shown.

The production phase is initiated once the self-learning of the RL agent (e.g., RL agent shown in FIG. 14) and/or prevention RL QoS optimization 60 determines/optimizes such as via one or more of processing circuitry 36, processor 38, radio interface 34, etc., a quality value function that relies on one or more of a probabilistic SoftMax state and action selection policy, evaluation of cost, QoS provisioning of transmission delay, queue delay metrics and a downstream reward evaluation. In response to receiving new metrics (e.g., metrics 112) indexed by nodes (e.g., wireless devices 22), the RL agent (e.g., RL agent shown in FIG. 14) and/or prevention RL QoS optimization 60 determines/produces such as via one or more of processing circuitry 36, processor 38, radio interface 34, etc., actions that are pushed towards µSDN to update routes in WSN 24. Therefore, the µSDN engine instructs nodes (e.g., wireless devices 22) to consider (e.g., use, operate based on) determined/optimized flowtables, e.g., rather relying on RPL ranking mechanism. Below, the reinforcement learning (RL) agent design is described, which falls into: Cost, QoS provisioning, Reward, Quality and state/action policy selection.

QoS Aware Reinforcement Learning Model

General Approach

Figure 14:
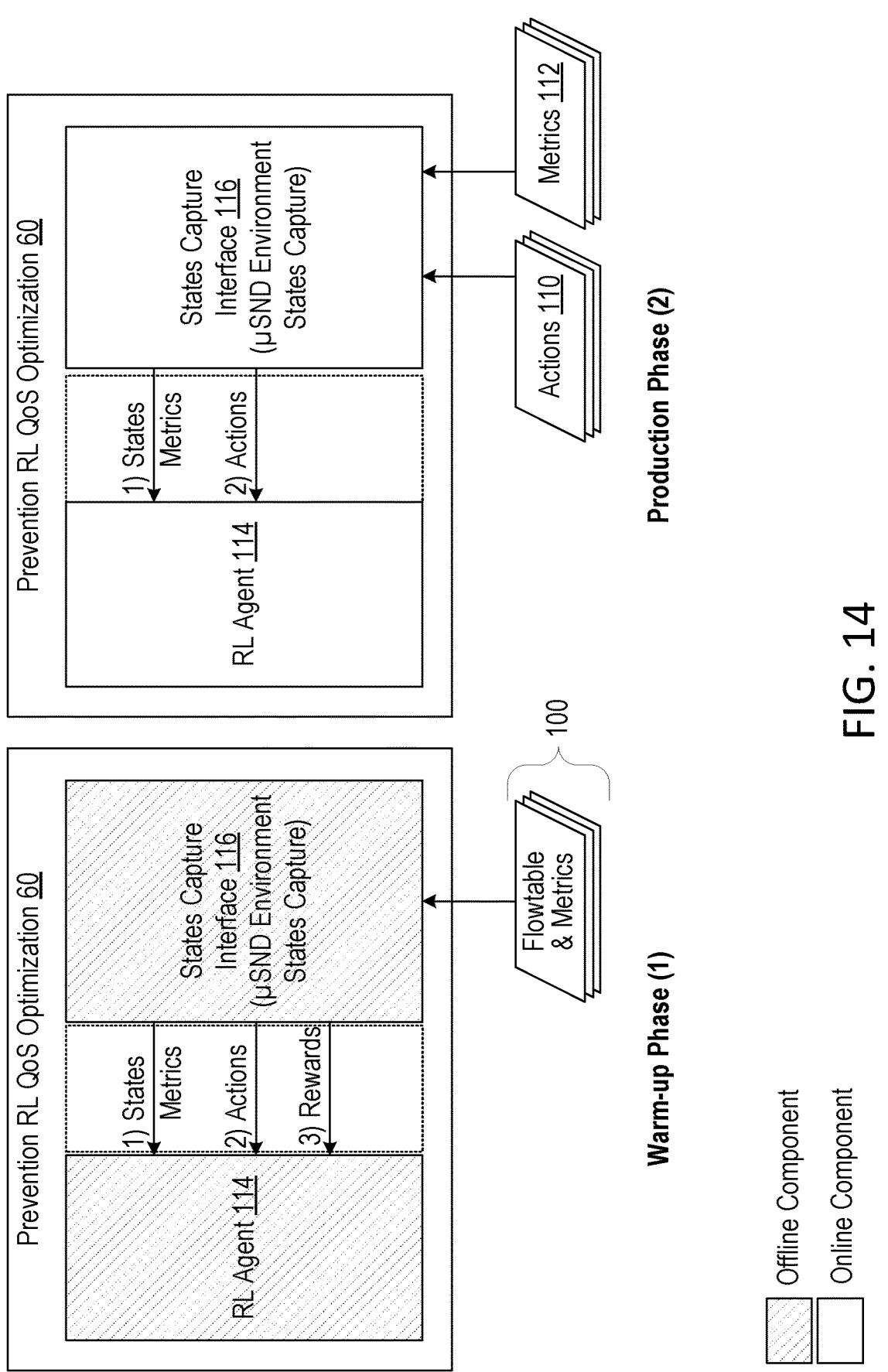
FIG. 14 is diagram of an example prevention RL QoS optimization block according to some embodiments of the present disclosure.

FIG. 14 is a diagram of an example prevention RL QoS optimization 60 according to one or more embodiments of the disclosure. The prevention RL QoS Optimization 60 illustrated in FIG. 13 may rely on a states capture interface 116 (e.g., µSND environment states capture), which receives/collects ground truth (e.g., flowtables and metrics 100) from the control plane and the RL agent 114, which implements the self-learning recursive process such as via one or more of processing circuitry 36, processor 38, radio interface 34, etc. The states capture interface 116 (e.g., µSND environment states capture) receives/collects flowtables and metrics 100 indexed per existing nodes in the observed DODAGs. During the warm-up phase, the states capture interface 116 (e.g., µSND environment states capture) feeds the RL agent 114 with states, which may be a map of DODAG nodes as well as their current parent and candidate parents. In addition, indexed metrics per child and parent or potential parent are kept by the RL agent 114 once positively rewarded. This helps to know how to proceed once it is in production phase. In the warm-up phase, the RL agent 114 and/or the sates capture interface 116 may be an offline component but are not limited as such.

In production phase, the states capture interface 116 (e.g., µSND environment states capture) will forward actions produced by the RL agent 114 to µSDN controller engine (e.g., controller engine 70) to update flowtables and instruct nodes in the data plane to follow the updated routes. In the production phase, the RL agent 114 and/or the sates capture interface 116 may be an online component but are not limited as such.

Below, several of the different notations used to design the RL model are described.

General Notations

The number of nodes (e.g., wireless devices 22) is n

The time of DODAG sampling $t \in \{1, 2, \ldots, d\}$

The total number of sampled DODAGs d, represented by states observed over time $S = \langle S_1, S_2, \ldots, S_d \rangle$ DODAG state $S_t$ is represented with states set for n nodes at time $$S_t = \langle S_t^1, S_t^2, \ldots, S_t^{n-1}, S_t^n \rangle$$

Possible actions set for n nodes at time t for a specific DODAG state $S_t$: $A'S_t = \langle A_t'^1, A_t'^2, \ldots, A_t'^{n-1}, A_t'^n \rangle$ Actions set considered for n nodes at time $$t: A_{S_t} = \langle A_t^1, A_t^2, \ldots, A_t^{n-1}, A_t^n \rangle,$$

which can be picked randomly from the set of possible actions, $A S_t \in A'S_t$ Actions over all the period of training $A' = \langle A'S_1, A'S_2, \ldots, A'S_d \rangle$ A state for node i at time t is represented by a parent node (uplink)

$$p_t^i$$

and set of potential parent candidate nodes $$C_t^i: S_t^i = \langle p_t^i, C_t^i \rangle$$

The number of potential uplink parents for a node i at time $$t: UP_t^i = |S_t^i|$$

Action on node i at time t is represented by the update functions removing current link with parent $$p_t^i$$

and adding another link with parent $$c_t^j$$

from $$C_t^i$$

or keeping current link with parent $$p_t^i$$

(an assumption may be that the agent considers updates just in uplink):

$$A_t^i = \langle remove\, (i,\, p_t^i),\, add\, (i,\, c_t^i) \rangle \text{ or } \langle keep\, (i,\, p_t^i) \rangle$$

$dl_{i,j}$ transmission delay on link (i, j)

$dq_j$ queue processing delay in parent node j $$pl_t^{i,j}$$

number of packets lost on link (i, j)

$$p_t^{i,j}$$

number of packets sent on link (i, j)

Cost Function

The cost function denotes how costly is the operation of updating a DODAG topology considering n nodes. For each node i in the DODAG graph, the cost of an action is $$g(A_t^i)$$

and is computed as follows:

$$g(A_t^i) = \begin{cases} 1 & \text{if } A_t^i = \langle remove(i,\, p_t^i), \quad add(i,\, c_t^i) \rangle \\ 0 & \text{if } A_t^i = keep(i,\, p_t^i) \end{cases}$$

At time t, the cost function associated with the DODAG state $S_t$, is $g(A_t)$, which is computed as follows:

$$g(A_{S_t}) = \sum_{i=1}^{n} g(A_t^i)$$

QoS Provisioning Functions

For a given update on a node i, within a DODAG, the decision is performed based on QoS provisioning delay on transmission and packet loss on link (i, j), delay of queue uplink flow processing on node j. The QoS provisioning is gauged such as via one or more of processing circuitry 36, processor 38, radio interface 34, etc., based on how a metric value compares with respect to the average of potential parent candidates. The gauging may be performed on range [−1,1] through arctan normalization. For a node i, and node j, which is maintained as a parent or selected as a new parent from the set of candidates $$C_t^i,$$

the QoS Provisioning functions $$delay_t^{i,j}, \text{ queue}_t^{i,j} \text{ and } plr_t^{i,j}$$

are computed as follows:

1. Transmission delay provisioning on node $$\frac{2}{\pi} arctan\left[ dl_{i,j} - \frac{\sum_{k=1}^{S_t^i} dl_{i,k}}{UP_t^i} \right]$$

2. Queue delay provisioning on selected parent $$\frac{2}{\pi} arctan\left[ dq_j - \frac{\sum_{k=1}^{S_t^i} dq_k}{UP_t^i} \right]$$

3. Packet loss rate on link (i, j):

$$plr_t^{i,j} = \frac{pl_t^{i,j}}{p_t^{i,j}}$$

4. The overall transmission delay of the $$DODAG: delay_{S_t} = \sum_{i=1}^{n} delay_t^{i,j}$$

where $$j \in \langle p_t^i, C_t^i \rangle$$

5. The overall queue delay of the $$DODAG: \text{queue}_{S_t} = \sum_{i=1}^{n} \text{queue}_t^{i,j}$$

where $$j \in \langle p_t^i, C_t^i \rangle$$

6. The overall packet loss rate of the $$DODAG: \text{plr}_{S_t} = \sum_{i=1}^{n} plr_t^{i,j}$$

where $$j \in \langle p_t^i, C_t^i \rangle$$

Reward Function

The reward function is based on QoS provisioning functions, which are meant to measure the reward behind choosing an action for route optimization. Specifically, the RL agent discovers such as via one or more of processing circuitry 36, processor 38, radio interface 34, etc., the uplink routing path with the highest QoS-aware reward. The reward function may be evaluated as follows:

$$R_{S_t} = -g(A_{S_t}) + \beta_1 \times (\text{dela} y_{S_t} + \text{queu} e_{S_t}) + \beta_2 \times plr_{S_t}$$

$\beta_1$, $\beta_2 \in [0,1]$ are the tuneable weights used to tweak the importance of QoS provisioning of delays and packet loss rate with respect to the reward function.

Quality Function

The quality function estimates the quality that is derived by the potential next system state, which can be determined by the RL agent such as via one or more of processing circuitry 36, processor 38, radio interface 34, etc., based on the states and actions on DODAG. The quality function $Q_{t+1}(S_t, A_{S_t})$ may rely on, for example, State Action Reward State Action (SARSA) modeling, where the agent uses the action and the state at time t+1 to update the quality value. Indeed, SARSA utilizes the policy (described below) that the RL agent follows in the future. This means that the RL agent such as via one or more of processing circuitry 36, processor 38, radio interface 34, etc., can explicitly adopt the future reward earned, rather than considering the optimal action with the highest reward. The quality function is derived as follows:

$$Q_{t+1}(S_t, A_{S_t}) \leftarrow Q_t(S_t, A_{S_t}) + \alpha \times [R_{S_t} + \gamma \times Q_t(S_{t+1}, A_{S_{t+1}}) - Q_t(S_t, A_{S_t})]$$

where $\gamma \in [0,1]$ is the discount factor that defines the importance of future rewards, $\alpha \in [0,1]$ is the learning rate which determines the override measure of the newly acquired quality value with respect to the old one, and the reward observed at time t. Consequently, the RL agent such as via one or more of processing circuitry 36, processor 38, radio interface 34, etc., updates the action selection policy based on the best possible quality value with respect to actions observed on DODAG. The best choice of actions is guaranteed through the action selection policy by observing $R_{S_t}$ and $S_{t+1}$ and updates the quality function $Q_{t+1}(S_t, A_{S_t})$ accordingly.

Action Selection Policy Function

Before defining the action selection policy function, it is noted that m is the number of all potential actions that can be performed on all observed DODAGs. For each node, all potential uplink parent nodes that can be kept or chosen at time t are enumerated.

$$m_t = \sum_{i=1}^{n} UP_t^i$$

Given d (the number of all observed DODAGs), the number of all potential actions m is expressed as follows:

$$m = \sum_{t=1}^{d} m_t$$

The temperature $\tau_m$ is a parameter used to control the trade-off between exploration and exploitation of states. The higher it is, the more DODAGs' states are discovered with equal probabilities. The temperature $\tau_m$ is computed as follows:

$$\tau_m = -\frac{(\tau_0 - \tau_T)^m}{T} + \tau_0$$

$$m \leq T$$

T denotes the upper bound deterministic time to ensure convergence, $\tau_0$ is the initial temperature, $\tau_T$ is the last temperature. In a highly dynamic environment like RPL DODAG, $\tau_m$ may need to be high to ensure exploration of different DODAG states.

$$\pi_t(S_t, A_{S_t}) = \frac{\exp(Q_t(S_t, A_{S_t})/\tau_m)}{\sum_{a'_{S_t} \in A'_{S_t}} \exp(Q_t(S_t, a'_{S_t})/\tau_m)}$$

$\pi_t(S_t, A_{S_t})$ denotes policy associated with a DODAG state $S_t$ and actions $A_{S_t}$ applied on it, and it may be computed through the Boltzmann Softmax policy, where the probability $\pi_t(S_t, A_{S_t})$ of a certain set of actions $A_{S_t}$ done on DODAG state $S_t$ is exponentially evaluated with respect to the sum of exponential evaluation of other potential actions $a'_{S_t} \in A'_{S_t}$.

Learning Procedure performed via one or more of processing circuitry 36, processor 38, radio interface 34, etc., Learn Function Q: $\mathcal{S} \times A \to R$ Require:
Sets of States' set: $\mathcal{S} = \{S_0, S_1, \ldots, S_{t-1}, S_t, \ldots, S_d\}$ Sets of Actions' set: A' = $\left(A'_{S_1}, A'_{S_2}, \ldots, A'_{S_d}\right)$
Reward function: R: $\mathcal{S} \times A' \to R$
Learning rate $\alpha \in [0, 1]$
Discount Factor $\gamma \in [0, 1]$
Number of potential actions m Temperature $\tau_m = -\dfrac{(\tau_0 - \tau_T)^m}{T} + \tau_0 \ m \le T$ /*Higher value means more exploration*/
Procedure Q – Value($\mathcal{S}$, A', R, T, $\alpha$, $\gamma$, $\tau_m$)
  Initialize Q: $\mathcal{S} \times A \leftarrow R$ arbitrarily
  For each epoch: /*Number of epochs high to ensure convergence*/
    s = random($\mathcal{S}$) /*pick up random state*/
    $a_s$ = random(A'$_s$) /*choose a set of actions on all nodes with
respect to DODAG state*/

$$\pi_t(s, a_s) = \frac{\exp\left(Q(s, a_s)/\tau_m\right)}{\Sigma_{a'_s \in A'_s}\exp\left(Q(s, a'_s)/\tau_m\right)} /*\text{choose current action and}$$

state using policy derived from Q*/
For each step of epoch: /*a step can be a random observed state on a
DODAG*/
  /*potentially all or part of other states*/
  r = –g($a_s$) + $\beta_1 \times$ (delay$_s$ + queue$_s$) + $\beta_2 \times$ plr$_s$ /*evaluate reward*/

$$\pi_t(\hat{s}, a_{\hat{s}}) = \frac{\exp\left(Q(\hat{s}, a_{\hat{s}})/\tau_m\right)}{\Sigma_{a'_{\hat{s}} \in A'_{\hat{s}}}\exp\left(Q(\hat{s}, a'_{\hat{s}})/\tau_m\right)} /*\text{choose future action and}$$

state using policy derived from Q*/
  Q(s, $a_s$) = Q(s, $a_s$) + $\alpha \times$ [r + $\gamma \times$ Q($\hat{s}$, $a_{\hat{s}}$) – Q(s, $a_s$)]
  s = $\hat{s}$ /*update current state with the future one*/
  $a_s$ = $a_{\hat{s}}$ /*update current action with the future one*/

Listing 1 SARSA Q-Value Learning

Due to the non-deterministic form of DODAGs as continuous changes of metrics observed in the control plane, one or more embodiments may be considered a model free reinforcement learning, namely, SARSA using temporal difference. The learning performed via one or more of processing circuitry 36, processor 38, radio interface 34, etc., may be an interactive dynamic programming algorithm to find the optimal solution based on a finite environment. The Quality value learning process is a recursive procedure, where for each training episode, a state and set of actions on nodes are randomly selected and evaluated such as via one or more of processing circuitry 36, processor 38, radio interface 34, etc., through the state/action selection policy to evaluate their prediction. Within each training episodes, the reward for current selected state and action is computed based at least on one or more of observed transmission and queue delays and packet loss rate. In addition, new future states are captured iteratively and used to evaluate the quality value, which can be positively or negatively impacted, by new chosen future states and actions. A, the end of each step, the current state and set of actions is updated with the newly selected ones. The learning is fulfilled once the quality value converges towards one. Listing 1 illustrates how the SARSA Quality value learning is performed.

Therefore, one or more embodiments describe herein provide a security preventive control that uses the programmability of SDN in 6LowPAN sensor networks to build a self-learning agent (e.g., RL agent that may be provided by QoS unit 26) that capture states through flowtables, and metrics collected from the control plane. The learning consists of optimizing RPL routing based on QoS metrics like delays and packet loss rate. The control plane and the application plane stack can be used at a wireless border router supporting 6LowPAN, introducing therefore a QoS awareness intelligence that may help avoid RPL rank attacks or sensitivity certain security attacks. One or more embodiments, described herein can be a support for 5G agnosticism with respect different wireless networks like 6LowPAN networks or SD6LowPAN. In some embodiments, an action includes selecting a parent node (i.e., a best parent node) in a graph (e.g., DODAG), for a child node, e.g., where the parent-child relationship is selected based on quality of service awareness to support a preventive security control to cope with security attacks (e.g., rank attacks) in SD6LowPAN networks.

In some embodiments, network node 16 (e.g., a border gateway/router) integrates a QoS Routing awareness through a control plane empowered by SDN (e.g., micro-SDN). The network node 16 uses RPL protocol machinery to self-learn how a network routing is performed using collected metrics and flow-table states. At one of at least two steps may be performed: (1) a collect data step/process; and/or (2) a self-learn step/process:

The collect data step/process helps to (i.e., is used to) gather a ground truth for network node 16 (e.g., a border gateway/router, intelligent border gateway) a mechanism to capture DODAG states including flow tables and metrics (e.g., from 6SDLowPAN to build a ground truth for a self-learning routing application).

The self-learn step/process is a process that lets (i.e., allows, causes, etc.) network node 16 (e.g., the intelligent border gateway) converge towards an awareness optima for the QoS Routing. The self-learning step/process may have a life-cycle including but not limited to the following steps/ phases:

Explore: expressed through a warm-up phase (e.g., a trial/error warm-up phase) which may use an offline-mode self-learning agent and receive flowtables and/or metrics as inputs;

Exploit: expressed through a production phase (e.g., online-mode self-learning agent), where inputs are metrics, and outputs are actions to be applied at least in part on flowtables; and Monitoring (e.g., a daemon topology monitor): checks if sensors are added or removed in DODAGs, where inputs are DODAGs, and outputs are Boolean (e.g., true/false). If an output is true, the process moves from exploit to explore. If the output is false, the exploit (e.g., of the self-learning agent) is kept.

In some other embodiments, the explore step/process described above may be a multi-epoch training process expressed through a model including any of the following elements/steps:

Reward function=–Cost Function+coefficient1*(QoS provisioning delay Functions)+coefficient2*(QoS provisioning loss rate);

Quality function: a SARSA model that controls convergence of the learning agent such as in terms of taking good decisions trough temporal differences (e.g., a choice is based DODAGs having non-deterministic forms and/or continuous changes of metrics);

Action Selection policy function: a probabilistic policy (e.g., a probabilistic Boltzmann Softmax policy) is used to select a set of actions with respect to DODAG states.

In an embodiment, a learning process (e.g., a self-learning process) may include any one of the following steps, which may be performed (such as via processing circuitry 36, processor 38, radio interface 34, etc.) interactively and/or in any order:

1. Pick up (i.e., determine, select, etc.) a random state depicting a DODAG snapshot and/or a random set of actions, e.g., on nodes such as WDs 22;
2. For picked state and action, evaluate the action and state using action selection policy function based on derived Quality value;
3. For each step in a training episode (i.e., of the self-learning process):
   a. Calculate a reward based on the cost of selected actions considering (i.e., based on) chosen state, the overall transmission delay, queue delay, and/or the overall packet loss rate;
   b. Select a potential future state and action, and evaluate action selection policy based on derived Quality value;
   c. Learn a new quality value (i.e., another quality value) by evaluating an impact of the reward and/or how a potential future state and future action compares with states and actions initially picked in step 1 above.
   d. Update a current state with the future state and a current action with the future action;
   e. Go back to (3); and/or
4. Capture (i.e., determine) an overall quality value, e.g., to check (i.e., determine) a convergence.

Some embodiments, according to the principles of the present disclosure, are as follows:

Embodiment A1. A network node, the network node configured to, and/or comprising a radio interface and/or comprising processing circuitry configured to:

perform quality of service, QoS, awareness based routing in Routing Protocol for Low-Power and Lossy Networks, RPL, protocol in a wireless sensor network.

Embodiment A2. The network node of Embodiment A1, wherein the network node is a border router to the wireless sensor network; and the wireless sensor network is a IPv6 low power wireless personal area network, SD6LowPAN, network.

Embodiment A3. The network node of Embodiment A1, wherein the performing of QoS awareness based routing in RPL protocol includes:

receiving, from a control plane, flowtables and metrics associated with a plurality of Destination Oriented Directed Acyclic Graphs (DODAGs); and determining at least one action to update at least one route in at least one DODAG based on the received flowtables and metrics; and pushing the at least one action to a controller in the control plane for instructing nodes in a data plane to update the at least one route based on the at least one action.

Embodiment A4. The network node of Embodiment A3, wherein the metrics include at least one of transmission delay, packet loss rate and queue delay.

Embodiment B1. A method implemented in a network node, the method comprising:

performing quality of service, QoS, awareness based routing in Routing Protocol for Low-Power and Lossy Networks, RPL, protocol in a wireless sensor network.

Embodiment B2. The method of Embodiment B1, wherein the network node is a border router to the wireless sensor network; and the wireless sensor network is a IPv6 low power wireless personal area network, SD6LowPAN, network.

Embodiment B3. The method of Embodiment B1, wherein the performing of QoS awareness based routing in RPL protocol includes:

receiving, from a control plane, flowtables and metrics associated with a plurality of Destination Oriented Directed Acyclic Graphs (DODAGs); and determining at least one action to update at least one route in at least one DODAG based on the received flowtables and metrics; and pushing the at least one action to a controller in the control plane for instructing nodes in a data plane to update the at least one route based on the at least one action.

Embodiment B4. The method of Embodiment B3, wherein the metrics include at least one of transmission delay, packet loss rate and queue delay.

Embodiment C1. A wireless device for a wireless sensor network, the wireless device configured to communicate with a network node, the wireless device configured to, and/or comprising a radio interface and/or processing circuitry configured to:

receive a pushed at least one action for instructing, in a data plane, the wireless device to update at least one route based on the at least one action, the at least one action being based on quality of service, QoS, awareness based routing in RPL protocol in the wireless sensor network; and update at least one route based on the pushed at least one action.

Embodiment C2. The WD of Embodiment C1, wherein the network node is a border router to the wireless sensor network; and the wireless sensor network is a IPv6 low power wireless personal area network, SD6LowPAN, network.

Embodiment C3. The WD of Embodiment C1, wherein the pushed at least one action is based on flowtables and metrics associated with at least one Destination Oriented Directed Acyclic Graphs (DODAGs); and the metrics including at least one of transmission delay, packet loss rate and queue delay.

Embodiment D1. A method implemented in a wireless device (WD), the method comprising:

receiving a pushed at least one action for instructing, in a data plane, the wireless device to update at least one route based on the at least one action, the at least one action being based on quality of service, QoS, awareness based routing in RPL protocol in the wireless sensor network; and updating at least one route based on the pushed at least one action Embodiment D2. The method of Embodiment D1, wherein the network node is a border router to the wireless sensor network; and the wireless sensor network is a IPv6 low power wireless personal area network, SD6LowPAN, network.

Embodiment D3. The method of Embodiment D1, wherein the pushed at least one action is based on flowtables and metrics associated with at least one Destination Oriented Directed Acyclic Graphs (DODAGs); and the metrics including at least one of transmission delay, packet loss rate and queue delay.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations That may be Used in the Preceding Description Include:

SDN Software Defined Networks

6LowPAN IPv6 Low Power wireless Area Networks

SD6LowPAN Software Defined IPv6 Low Power wireless Area Networks

RPL Routing Protocol for Low-Power and Lossy Networks

DODAG Destination Oriented Directed Acyclic Graph

RL Reinforcement Learning

SARSA State Action Reward State Action

QoS Quality of Service

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured for performing network routing associated with a plurality of wireless devices, WDs, in a communication system, the network node comprising processing circuitry configured to:

collect, from a control plane, a plurality of graph states associated with a plurality of graphs, each graph of the plurality of graphs having at least one graph node associated with one WD of the plurality of WDs;

determine, using self-learning, at least one action to update at least one route in at least one graph of the plurality of graphs based on the collected plurality of graphs states, the self-learning comprising:

entering a warm-up phase comprising exploring the plurality of graph states as a ground truth to self-learn optimizing network routes; and entering a production phase including:

exploiting the explored plurality of graph states of the warm-up phase; and determining a plurality of actions including the at least one action to update the at least on route in at least one graph; and cause the network node to transmit the at least one action to a controller for instructing at least one WD to update at least one network route based on the at least one action.

2. The network node of claim 1, wherein the self-learning is based at least in part on a quality of service parameter.

3. The network node of claim 1, wherein the plurality of graph states includes flowtables and metrics, the metrics including at least one of a transmission delay, a packet loss rate, and a queue delay.

4. The network node of claim 1, wherein the self-learning further includes any one of:

monitoring a topology of at least one graph of the plurality of graphs;

when at least one WD has been one of removed from and added to the at least one graph, one of enter and continue with the warm-up phase; and when at least one WD has not been one of removed from and added to the at least one graph, one of enter and continue with the production phase.

5. The network node of claim 1, wherein the self-learning further includes:

selecting a random state depicting a graph snapshot and a random plurality of actions for each graph node; and evaluating the selected random state and the random plurality of actions using a probabilistic policy based on a derived quality value.

6. The network node of claim 5, wherein the self-learning further includes:

determining a reward based on a cost of the random plurality of actions, the selected random state, an overall transmission delay, a queue delay, and overall packet loss rate;

determining a future state and a future action;

evaluating an action selection policy based on the derived quality value;

learning another quality value by evaluating an impact of the reward and how the future state and the future action compare with the selected random state and random plurality of actions;

updating a current state with the future state and a current action with the future action; and capturing an overall quality value determine a convergence.

7. The network node of claim 6, wherein updating the current state and the current action includes selecting a graph node that is a parent to another graph node, the selecting being based at least on the derived quality value.

8. The network node of claim 1, wherein the controller is in the control plane, the at least one WD is in a data plane, and transmitting the at least one action triggers the WD to update the at least one network route.

9. The network node of claim 1, wherein the plurality of graphs is a plurality of Destination Oriented Directed Acyclic Graphs, DODAGs.

10. The network node of claim 1, wherein the communication system includes a wireless sensor network, the network routing is a Quality of Service, QoS, awareness-based routing that is performed in Routing Protocol for low Power and Lossy networks, RPL, in the wireless sensor network, the network node is a border router to the wireless sensor network, and the wireless sensor network is a IPv6 low power wireless personal area network, SD6LowPAN, network.

11. A method implemented in a network node configured for performing network routing associated with a plurality of wireless devices, WDs, in a communication system, the method comprising:

collecting, from a control plane, a plurality of graph states associated with a plurality of graphs, each graph of the plurality of graphs having at least one graph node associated with one WD of the plurality of WDs;

determining, using self-learning, at least one action to update at least one route in at least one graph of the plurality of graphs based on the collected plurality of graphs states, the self-learning comprising:

entering a warm-up phase comprising exploring the plurality of graph states as a ground truth to self-learn optimizing network routes; and entering a production phase including:

exploiting the explored plurality of graph states of the warm-up phase; and determining a plurality of actions including the at least one action to update the at least on route in at least one graph; and transmitting the at least one action to a controller for instructing at least one WD to update at least one network route based on the at least one action.

12. The method of claim 11, wherein the self-learning is based at least in part on a quality of service parameter.

13. The method of claim 11, wherein the plurality of graph states includes flowtables and metrics, the metrics including at least one of a transmission delay, a packet loss rate, and a queue delay.

14. The method of claim 11, wherein the self-learning further includes any one of:

monitoring a topology of at least one graph of the plurality of graphs;

when at least one WD has been one of removed from and added to the at least one graph, one of enter and continue with the warm-up phase; and when at least one WD has not been one of removed from and added to the at least one graph, one of enter and continue with the production phase.

15. The method of claim 11, wherein the self-learning further includes:

selecting a random state depicting a graph snapshot and a random plurality of actions for each graph node; and evaluating the selected random state and the random plurality of actions using a probabilistic policy based on a derived quality value.

16. The method of claim 15, wherein the self-learning further includes:

determining a reward based on a cost of the random plurality of actions, the selected random state, an overall transmission delay, a queue delay, and overall packet loss rate;

determining a future state and a future action;

evaluating an action selection policy based on the derived quality value;

learning another quality value by evaluating an impact of the reward and how the future state and the future action compare with the selected random state and random plurality of actions;

updating a current state with the future state and a current action with the future action; and capturing an overall quality value determine a convergence.

17. The method of claim 16, wherein updating the current state and the current action includes selecting a graph node that is a parent to another graph node, the selecting being based at least on the derived quality value.

18. The method of claim 11, wherein the controller is in the control plane, the at least one WD is in a data plane, and transmitting the at least one action triggers the WD to update the at least one network route.

19. The method of claim 11, wherein the plurality of graphs is a plurality of Destination Oriented Directed Acyclic Graphs, DODAGs.

20. The method of claim 11, wherein the communication system includes a wireless sensor network, the network routing is a Quality of Service, QoS, awareness-based routing that is performed in Routing Protocol for low Power and Lossy networks, RPL, in the wireless sensor network, the network node is a border router to the wireless sensor network, and the wireless sensor network is a IPv6 low power wireless personal area network, SD6LowPAN, network.

21. A wireless device, WD, configured to communicate with a network node in a communication system, the WD comprising processing circuitry and a radio interface in communication with the processing circuitry, the radio interface being configured to:

receive at least one action for instructing the WD to update at least one network route, the at least one action being determined using self-learning, the at least one network route being in at least one graph of a plurality of graphs, the self-learning comprising:

entering a warm-up phase comprising exploring the plurality of graph states as a ground truth to self-learn optimizing network routes; and entering a production phase including:

exploiting the explored plurality of graph states of the warm-up phase; and determining a plurality of actions including the at least one action to update the at least on route in at least one graph; and the processing circuitry being configured to:

update the at least one network route based on the received at least one action.

22. The WD of claim 21, wherein the self-learning is based at least in part on a quality of service parameter.

23. The WD of claim 21, wherein the received at least one action is further determined based on flowtables and metrics associated with the at least one graph, the metrics including at least one of a transmission delay, a packet loss rate, and a queue delay.

24. The WD of claim 21, wherein the instructing is in a data plane.

25. The WD of claim 21, wherein the plurality of graphs is a plurality of Destination Oriented Directed Acyclic Graphs, DODAGs.

26. The WD of claim 21, wherein the communication system includes a wireless sensor network, the at least one network route is a Quality of Service, QoS, awareness-based routing that is performed in Routing Protocol for low Power and Lossy networks, RPL, in the wireless sensor network, the network node is a border router to the wireless sensor network, and the wireless sensor network is a IPv6 low power wireless personal area network, SD6LowPAN, network.

27. A method implemented in a wireless device, WD, configured to communicate with a network node in a communication system, the method including:

receiving a at least one action for instructing the WD to update at least one network route, the at least one action being determined using self-learning, the at least one network route being in at least one graph of a plurality of graphs, the self-learning comprising:

entering a warm-up phase comprising exploring the plurality of graph states as a ground truth to self-learn optimizing network routes; and entering a production phase including:

exploiting the explored plurality of graph states of the warm-up phase; and determining a plurality of actions including the at least one action to update the at least on route in at least one graph; and updating the at least one network route based on the received at least one action.

28. The method of claim 27, wherein the self-learning is based at least in part on a quality of service parameter.

29. The method of claim 27, wherein the received at least one action is further determined based on flowtables and metrics associated with the at least one graph, the metrics including at least one of a transmission delay, a packet loss rate, and a queue delay.

30. The method of claim 27, wherein the instructing is in a data plane.

31. The method of claim 27, wherein the plurality of graphs is a plurality of Destination Oriented Directed Acyclic Graphs, DODAGs.

32. The method of claim 27, wherein the communication system includes a wireless sensor network, the at least one network route is a Quality of Service, QoS, awareness-based routing that is performed in Routing Protocol for low Power and Lossy networks, RPL, in the wireless sensor network, the network node is a border router to the wireless sensor network, and the wireless sensor network is a IPv6 low power wireless personal area network, SD6LowPAN, network.

* * * * *